(12) United States Patent
Nakano et al.

(10) Patent No.: US 9,390,716 B2
(45) Date of Patent: Jul. 12, 2016

(54) CONTROL METHOD FOR HOUSEHOLD ELECTRICAL APPLIANCE, HOUSEHOLD ELECTRICAL APPLIANCE CONTROL SYSTEM, AND GATEWAY

(71) Applicant: Panasonic Intellectual Property Corporation of America, Torrance, CA (US)

(72) Inventors: Toshihisa Nakano, Osaka (JP); Motoji Ohmori, Osaka (JP); Takako Hirose, Kyoto (JP); Masayuki Kozuka, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 14/423,796

(22) PCT Filed: Apr. 16, 2014

(86) PCT No.: PCT/JP2014/002173
§ 371 (c)(1),
(2) Date: Feb. 25, 2015

(87) PCT Pub. No.: WO2014/171144
PCT Pub. Date: Oct. 23, 2014

(65) Prior Publication Data
US 2015/0243287 A1     Aug. 27, 2015

Related U.S. Application Data

(60) Provisional application No. 61/813,856, filed on Apr. 19, 2013.

(51) Int. Cl.
*G10L 15/30* (2013.01)
*G10L 17/22* (2013.01)
(Continued)

(52) U.S. Cl.
CPC ............ *G10L 17/22* (2013.01); *G10L 15/08* (2013.01); *G10L 15/22* (2013.01); *G10L 15/30* (2013.01)

(58) Field of Classification Search
USPC .................................. 704/275, 270.1
See application file for complete search history.

(56) References Cited

U.S. PATENT DOCUMENTS 8,032,383 B1 *  10/2011  Bhardwaj et al. ............ 704/275
9,230,560 B2 *   1/2016  Ehsani .................... G10L 21/06
(Continued)

FOREIGN PATENT DOCUMENTS

JP    2001-337695     12/2001
JP    2002-182896      6/2002
(Continued)

OTHER PUBLICATIONS

International Search Report issued Jul. 29, 2014 in International (PCT) Application No. PCT/JP2014/002173.

*Primary Examiner* — Abul Azad
(74) *Attorney, Agent, or Firm* — Wenderoth, Lind & Ponack, L.L.P.

(57) ABSTRACT

A gateway (103) determines whether or not voice information collected by a sound collecting device (102) needs to be subjected to voice recognition by a server apparatus (101), and only voice information that is determined to need to be subjected to voice recognition by the server apparatus (101) is transmitted by the gateway (103) to the server apparatus (101). The server apparatus (101) recognizes the received voice information, decides a control instruction, and transmits the control instruction to a household electrical appliance (104) via the gateway (103).

21 Claims, 21 Drawing Sheets

(51) Int. Cl.
*G10L 15/08* (2006.01)
*G10L 15/22* (2006.01)

(56) References Cited

U.S. PATENT DOCUMENTS

| | | |
|---|---|---|
| 2001/0056346 A1 | 12/2001 | Ueyama et al. |
| 2003/0074199 A1 | 4/2003 | Kuzunuki et al. |
| 2003/0074200 A1 | 4/2003 | Kuzunuki et al. |
| 2004/0019489 A1* | 1/2004 | Funk .................. H04L 12/2803 704/275 |
| 2004/0199394 A1 | 10/2004 | Kuzunuki et al. |
| 2005/0043946 A1 | 2/2005 | Ueyama et al. |
| 2005/0149332 A1 | 7/2005 | Kuzunuki et al. |
| 2009/0271002 A1* | 10/2009 | Asofsky .................. G10L 15/26 704/275 |
| 2012/0162540 A1 | 6/2012 | Ouchi et al. |

FOREIGN PATENT DOCUMENTS

| | | |
|---|---|---|
| JP | 2003-115929 | 4/2003 |
| JP | 2009-265219 | 11/2009 |
| JP | 2012-124550 | 6/2012 |
| JP | 2012-133243 | 7/2012 |

* cited by examiner

FIG. 6

CONTROL INFORMATION TABLE

| DEVICE TYPE | CONTROL INSTRUCTION |
|---|---|
| AIR CONDITIONER | POWER ON |
| | POWER OFF |
| | RAISE TEMPERATURE BY 1 DEGREE |
| | : |
| TELEVISION | POWER ON |
| | POWER OFF |
| | : |
| WASHING MACHINE | START OPERATION |
| | : |
| ELECTRONIC SHUTTER | CLOSE |
| | : |

FIG. 7

DEVICE MANAGEMENT INFORMATION TABLE

| GATEWAY ID | DEVICE ID | DEVICE TYPE |
|---|---|---|
| 32456389 | 123456 | AIR CONDITIONER |
|  | 896023 | TELEVISION |
|  | : | : |
| 95749291 | 789012 | TELEVISION |
|  | 014259 | WASHING MACHINE |
|  | : | : |
|  | 256789 | ELECTRONIC SHUTTER |

FIG. 8

CONTROL INFORMATION TABLE

| DEVICE TYPE | CONTROL INSTRUCTION | FIXED PHRASE |
|---|---|---|
| AIR CONDITIONER | POWER ON | AIR CONDITIONER ON, TURN ON AIR CONDITIONER,... |
| | POWER OFF | AIR CONDITIONER OFF, TURN OFF AIR CONDITIONER,... |
| | RAISE TEMPERATURE BY 1 DEGREE | RAISE TEMPERATURE,... |
| | ; | ; |
| TELEVISION | POWER ON | TELEVISION ON, TURN ON TELEVISION,... |
| | POWER OFF | TELEVISION OFF, TURN OFF TELEVISION,... |
| | ; | ; |

FIG. 9

DEVICE MANAGEMENT INFORMATION TABLE

| DEVICE ID | DEVICE TYPE |
|---|---|
| 123456 | AIR CONDITIONER |
| 896023 | TELEVISION |
| ⋮ | ⋮ |

FIG. 18

| GATEWAY ID | DATE | CONFIRMATION RESULT | VOICE INFORMATION | RECOGNIZED CONTROL INSTRUCTION |
|---|---|---|---|---|
| 32456389 | 2013/3/5 | CONSENT | ATSUI (HOT) | POWER ON OF AIR CONDITIONER |
| ⋮ | ⋮ | ⋮ | ⋮ | ⋮ |
| ⋮ | ⋮ | ⋮ | ⋮ | ⋮ |

FIG. 21

POWER ON OF AIR CONDITION?

PLEASE INPUT
CONFIRMATION RESULT BY VOICE.

CONTROL METHOD FOR HOUSEHOLD ELECTRICAL APPLIANCE, HOUSEHOLD ELECTRICAL APPLIANCE CONTROL SYSTEM, AND GATEWAY

TECHNICAL FIELD

The present invention relates to a household electrical appliance control system in which a sound collecting device capable of connecting to a network collects voice information and a household electrical appliance is controlled via the network based on the collected voice information.

BACKGROUND ART

In recent years, with the proliferation of household electrical appliances with network connecting functions, systems for controlling household electrical appliances via a network have been proposed. In addition, with improvements in recognition rate in voice recognition technology, it is becoming possible to input a voiced operation instruction for a household electrical appliance to control the household electrical appliance.

As conventional voice recognition systems, techniques are proposed in which voice information input at a client is transmitted to a server and the server performs voice recognition in order to reduce load on the client with limited processing capability (for example, refer to Patent Literature 1).

In Patent Literature 1 described above, an amount of data transmission between the client and the server is reduced by having the client compression-encode a feature parameter of voice information and transmit the compression-encoded feature parameter.

However, with Patent Literature 1 described above, since the server performs all voice recognition, voice information of all voice recognition objects is transmitted from the client to the server. In other words, all voice information input by the client is transferred to the server. As a result, there is a need to further reduce the amount of data transmission between the client and the server in order to avoid data from concentrating at the server.

CITATION LIST

Patent Literature

Patent Literature 1: Japanese Unexamined Patent Publication No. 2001-337695

SUMMARY OF INVENTION

A control method according to an aspect of the present invention for solving the problem described above is a control method for a household electrical appliance in a household electrical appliance control system including a server apparatus, a household electrical appliance, a gateway, and a sound collecting device, wherein:

the gateway receives voice information of a user from the sound collecting device, analyzes the received voice information, and when judging that the analyzed voice information is voice information related to control of the household electrical appliance, transmits the voice information to the server apparatus;

the server apparatus recognizes the voice information received from the gateway, and when judging that the recognized voice information is voice information related to control of the household electrical appliance, transmits a control instruction corresponding to the voice information to the gateway; and the household electrical appliance receives the control instruction from the server apparatus via the gateway and executes the control instruction.

BRIEF DESCRIPTION OF DRAWINGS

FIG. 6 is a diagram showing an example of a data configuration of a control information table according to an embodiment of the present invention.

FIG. 7 is a diagram showing an example of a data configuration of a device management information table according to an embodiment of the present invention.

FIG. 8 is a diagram showing an example of a data configuration of a control information table that is stored by a control information storing unit according to an embodiment of the present invention.

FIG. 9 is a diagram showing an example of a data configuration of a device management information table according to an embodiment of the present invention.

FIG. 18 is a diagram showing an example of a data configuration of a recognition result database according to an embodiment of the present invention.

FIG. 21 is a diagram showing an example of a screen for inquiring contents of a control instruction to a user according to an embodiment of the present invention.

DESCRIPTION OF EMBODIMENTS

Figure 1:
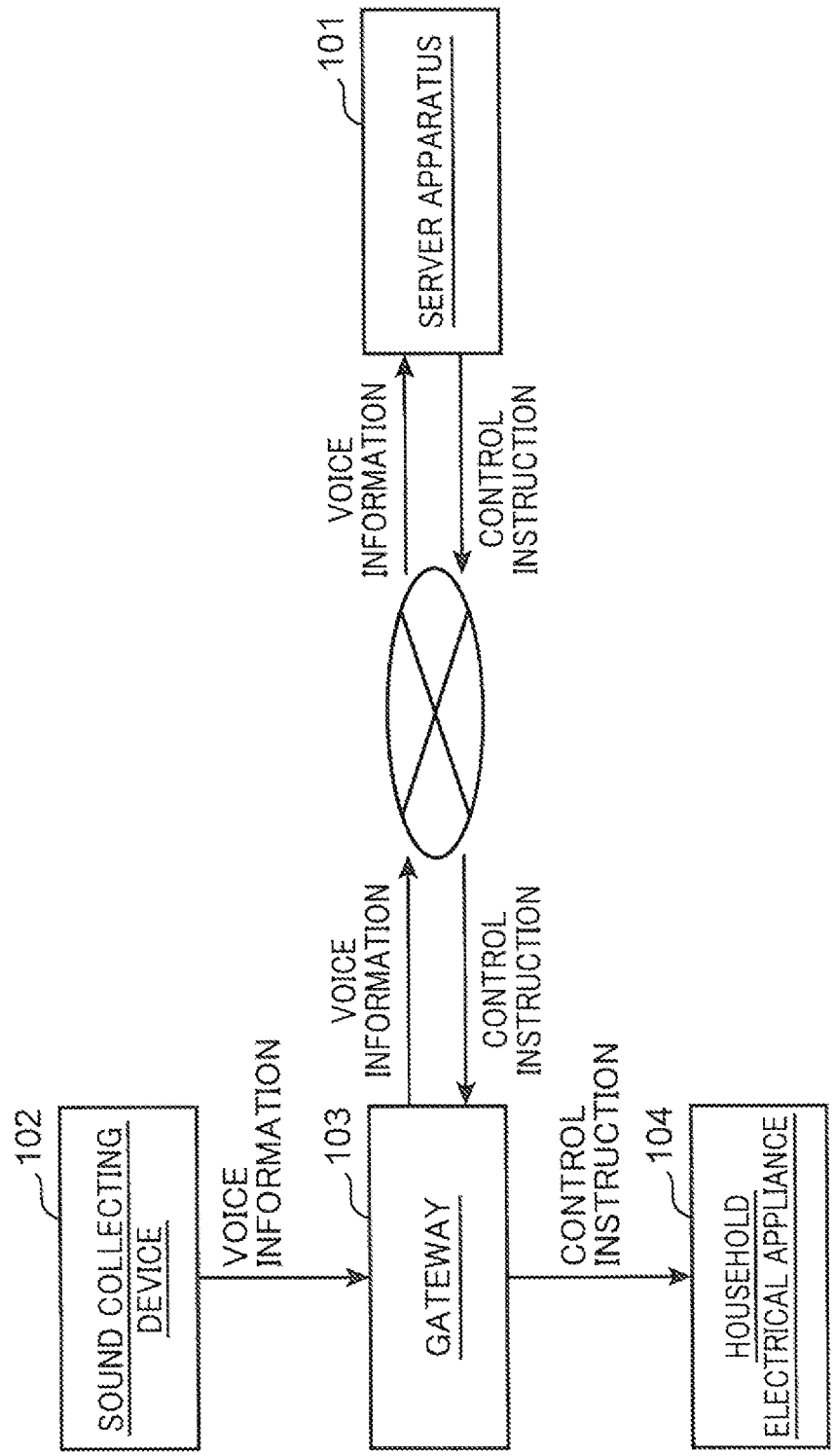
FIG. 1 is a diagram showing an example of an overall configuration of a household electrical appliance control system according to an embodiment of the present invention.

Circumstances Leading to an Aspect of the Present Invention

In recent years, studies are being carried out regarding techniques in which a sound collecting device installed in a room collects conversation carried out by a user and sound caused by activities of the user and transmits the sound to a cloud server, the cloud server analyzes the sound to interpret instructions, intentions, situations, and the like of the user, and a household electrical appliance installed in the room is controlled based on the interpretation.

In order to have the cloud server interpret instructions, intentions, situations, and the like of the user, the sound collected by the sound collecting device is favorably transmitted to the cloud server in its entirety. In doing so, privacy of the user becomes an issue. Specifically, there are users who are apprehensive in terms of privacy when sound is entirely transmitted to the cloud server.

In Patent Literature 1 described above, since all voice information of a recognition object are transmitted to the cloud server, there is a complete failure to consider the privacy of the user. Therefore, Patent Literature 1 is completely incapable of meeting the demands of users that entertain such apprehensions.

Furthermore, in Patent Literature 1, since all voice information to be recognition objects are transmitted to a server as described earlier in Background Art, further improvements must be made in order to avoid concentration of data at the server.

An object of an aspect of the present invention is to provide a technique which enables privacy of a user to be protected, concentration of data at a server to be avoided, and voice information of the user to be recognized to appropriately control a household electrical appliance owned by the user.

A control method according to an aspect of the present invention is a control method for a household electrical appliance in a household electrical appliance control system including a server apparatus, a household electrical appliance, a gateway, and a sound collecting device, wherein:

the gateway receives voice information of a user from the sound collecting device, analyzes the received voice information, and when judging that the analyzed voice information is voice information related to control of the household electrical appliance, transmits the voice information to the server apparatus;

the server apparatus recognizes the voice information received from the gateway, and when judging that the recognized voice information is voice information related to control of the household electrical appliance, transmits a control instruction corresponding to the voice information to the gateway; and the household electrical appliance receives the control instruction from the server apparatus via the gateway and executes the control instruction.

In this case, if the voice information collected by the sound collecting device includes, for example, a predetermined keyword and the voice information is related to control of a household electrical appliance, the gateway transmits the voice information to the server apparatus. In other words, if the voice information is not related to control of a household electrical appliance, the gateway does not transmit the voice information to the server apparatus. Therefore, an amount of data transfer of voice information that is transmitted to the server apparatus for voice recognition can be reduced.

In addition, only voice information, which is determined by the gateway to need to be transmitted to the server apparatus among the voice information collected by the sound collecting device, is transmitted to the server apparatus. Therefore, private information such as conversation that takes place in a home can be prevented from being transmitted to the server apparatus.

In the aspect described above, when judging that the voice information received from the sound collecting device indicates a fixed phrase related to control of the household electrical appliance, the gateway may transmit a control instruction corresponding to the fixed phrase to the household electrical appliance instead of transmitting the voice information to the server apparatus.

In this case, if the voice information collected by the sound collecting device is a fixed phrase, the gateway transmits a control instruction corresponding to the fixed phrase to the household electrical appliance. In other words, when the gateway is able to decide a control instruction with respect to a household electrical appliance that is a control object on its own, the gateway does not transmit voice information to the server apparatus.

Therefore, the amount of data transfer of voice information that is transmitted to the server apparatus for voice recognition can be further reduced and, at the same time, privacy of the user can be further protected.

In the aspect described above, when judging that the received voice information indicates the fixed phrase, the gateway may cause contents of a control instruction corresponding to the fixed phrase to be output to an input apparatus connected via a network, and when a confirmation input by the user signifying that the contents are correct is accepted by the input apparatus, the gateway may transmit the control instruction corresponding to the fixed phrase to the household electrical appliance.

In this case, an inquiry is made to the user regarding whether or not the control instruction recognized by the server apparatus is correct, and when a confirmation result signifying that the contents are correct is input, the control instruction is transmitted to the household electrical appliance. Therefore, the household electrical appliance can be prevented from performing an operation that is contrary to the user's intention.

In the aspect described above, the gateway may cause contents of the control instruction received from the server apparatus to be output to an input apparatus connected via a network, and when a confirmation input by the user signifying that the contents are correct is accepted by the input apparatus, the gateway may transmit the control instruction received from the server apparatus to the household electrical appliance.

In this case, an inquiry is made to the user regarding whether or not the control instruction recognized by the gateway is correct, and when a confirmation result signifying that the contents are correct is input, the control instruction is transmitted to the household electrical appliance. Therefore, the household electrical appliance can be prevented from performing an operation that is contrary to the user's intention.

In the aspect described above, the server apparatus may transmit an inquiry notification for making an inquiry to the user regarding whether or not a recognition result of the voice information transmitted from the gateway is correct, and the gateway may cause the recognition content indicated by the inquiry notification to be output to an input apparatus connected via a network, and when voice information which indicates an answer from the user with respect to the recognition content and which is accepted by the input apparatus is received from the input apparatus, the gateway may transmit the accepted voice information to the server apparatus without analyzing the voice information.

When a mode is adopted in which the gateway uniformly analyzes all voice information indicating an answer from the user, for example, if voice information includes a fixed phrase, the gateway transmits a control instruction corresponding to the fixed phrase to a household electrical appliance. In this case, the server apparatus cannot acquire a confirmation result by the user and therefore is unable to determine whether or not a recognition result of the voice information is correct. In consideration thereof, in the present aspect, when the gateway receives voice information indicating an answer from the user from the input apparatus, the gateway transmits the voice information to the server apparatus without analyzing the voice information. Accordingly, a situation where the server apparatus is unable to acquire an answer from the user can be avoided.

In the aspect described above, when transmitting the voice information to the server apparatus, the gateway may output an inquiry notification for making an inquiry to the user regarding whether or not the transmission is to be permitted, to an input apparatus connected via a network, and when a confirmation input by the user that permits the transmission is accepted by the input apparatus, the gateway may transmit the voice information to the server apparatus.

In this case, even when the gateway determines that voice information is to be transmitted to the server apparatus, the voice information is transmitted to the server apparatus only when permission to transmit the voice information to the server apparatus is obtained from the user. Therefore, the privacy of the user can be further protected and, at the same time, the amount of data to be transmitted to the server apparatus can be reduced.

In the aspect described above, when transmitting the voice information to the server apparatus, the gateway may acquire environmental information on surroundings of the gateway and transmit the environmental information to the server apparatus, and the server apparatus may decide the control instruction using the voice information and the environmental information transmitted from the gateway.

In this case, since not only voice information but environmental information on surroundings of the gateway or, in other words, environmental information on the inside of a user's home is also transmitted to the server apparatus, the server apparatus can more accurately decide a control instruction that is intended by the user.

In the aspect described above, the gateway may decide a control instruction corresponding to the fixed phrase using a control information table in which the fixed phrase and a control instruction corresponding to the fixed phrase are stored in association with each other.

In this case, since a fixed phrase and a control instruction corresponding to the fixed phrase are associated with each other in the control information table, the gateway can swiftly and accurately decide a control instruction corresponding to the fixed phrase.

In the aspect described above, the fixed phrase may be a phrase including a household electrical appliance to be a control object and a control instruction with respect to the household electrical appliance, and the voice information related to control of the household electrical appliance may be voice information that does not correspond to the fixed phrase but includes a word related to control of the household electrical appliance.

Hereinafter, an embodiment of the present invention will be described with reference to the drawings.

Embodiment 1.1 Configuration of Household Electrical Appliance Control System

FIG. 1 is a diagram showing an example of an overall configuration of a household electrical appliance control system according to an embodiment. As shown in FIG. 1, the household electrical appliance control system includes a server apparatus 101, a sound collecting device 102, a gateway 103, and a household electrical appliance 104.

In the example shown in FIG. 1, the sound collecting device 102, the gateway 103, and the household electrical appliance 104 are installed in a home of a user. The gateway 103 and the server apparatus 101 are connected by an external network to be capable of communicating with each other. As the external network, for example, the Internet is adopted. Therefore, the gateway 103 and the server apparatus 101 communicate with each other using an Internet communication protocol such as TCP/IP. The sound collecting device 102, the gateway 103, and the household electrical appliance 104 are connected so as to be capable of communicating with each other via an internal network. As the internal network, for example, an IEEE 802.3 series wired LAN, an IEEE 802.11 series wireless LAN, or a local area network that combines the two is adopted.

Examples of the household electrical appliance 104 that is a control object include air conditioning devices such as an air conditioner, AV devices such as a television, a washing machine, a lighting fixture, an electronic shutter device, and an intercom. The gateway 103 manages the household electrical appliance 104 connected to the gateway 103 in association with a device ID and a device type that identify the household electrical appliance 104.

The sound collecting device 102 in the home collects voice information including conversations by the user and transmits the voice information to the gateway 103 in the home. The gateway 103 having received the voice information performs a simplified analysis of the received voice information (input voice) using a database that includes a voice model, dictionary data, and the like. In addition, when the analysis result is a fixed phrase related to control of the household electrical appliance 104, the gateway 103 transmits a control instruction indicated by the fixed phrase to the household electrical appliance 104. Moreover, the "fixed phrase" is an analysis keyword stored in advance in a database of the gateway 103 and a control instruction is associated with the "fixed phrase" in advance. Therefore, by referring to the database, the gateway 103 can identify a control instruction indicated by the "fixed phrase" obtained as an analysis result. When the analysis result is a fixed phrase stored in advance, the gateway 103 does not transmit voice information to the server apparatus 101.

On the other hand, when the analysis result is not a fixed phrase but includes a word (for example, "power") related to control of the household electrical appliance 104, the gateway 103 transmits the voice information received from the sound collecting device 102 to the server apparatus 101. Moreover, the "word" is an analysis keyword stored in advance in a database of the gateway 103 and is not associated with a control instruction. Therefore, the gateway 103 is unable to associate the "word" with a control instruction for controlling the household electrical appliance 104. When the analysis result does not include a fixed phrase stored in advance but includes a word stored in advance, the gateway 103 transmits voice information to the server apparatus 101.

The server apparatus 101 having received the voice information performs a recognition process of the received voice information (input voice) using a database that includes a voice model, dictionary data, and the like. When the recognition includes contents (for example, "want to watch television") related to control of the household electrical appliance 104, the server apparatus 101 transmits a control instruction to the household electrical appliance 104 via the gateway 103.

1.2 Configuration of Server Apparatus 101

Figure 2:
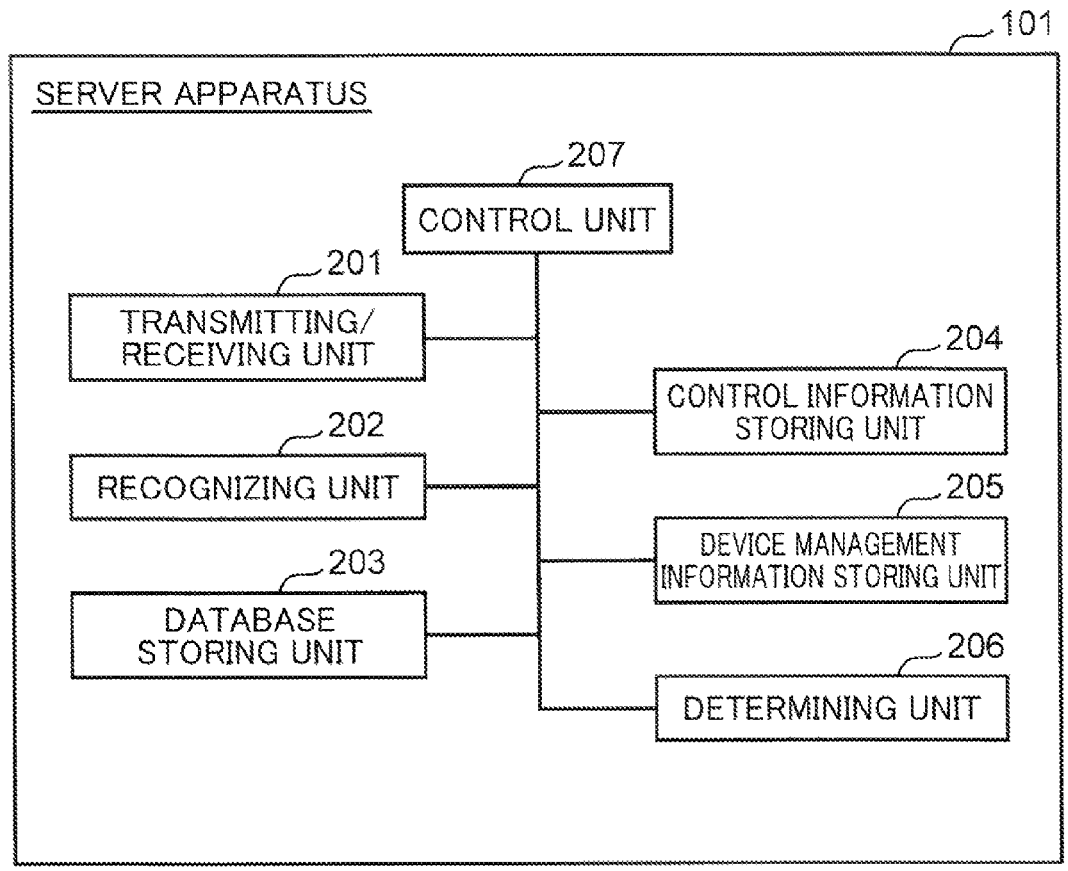
FIG. 2 is a block diagram showing an example of a configuration of a server apparatus according to an embodiment of the present invention.

Next, a detailed configuration of the server apparatus 101 will be described. FIG. 2 is a block diagram showing an example of a configuration of the server apparatus 101.

As shown in FIG. 2, the server apparatus 101 includes a transmitting/receiving unit 201, a recognizing unit 202, a database storing unit 203, a control information storing unit 204, a device management information storing unit 205, a determining unit 206, and a control unit 207.

The server apparatus 101 is constituted by a microprocessor, a RAM, a ROM, a hard disk, and the like which are not specifically illustrated. A computer program is stored in the RAM, the ROM, and the hard disk. The server apparatus 101 fulfills its functions as the microprocessor operates in accordance with the computer program.

Alternatively, the respective functional blocks of the server apparatus 101 including the transmitting/receiving unit 201, the recognizing unit 202, the database storing unit 203, the control information storing unit 204, the device management information storing unit 205, the determining unit 206, the control unit 207 and the like may be realized by an LSI that is an integrated circuit. The respective functional blocks may be individually configured as single chips or may include one or more blocks or a part of the respective blocks.

Moreover, while an LSI has been cited herein, other terms such as an IC, a system LSI, a super LSI, or an ultra LSI may be used depending on degrees of integration.

In addition, a method of circuit integration is not limited to an LSI and may be realized using a dedicated circuit or a general-purpose processor. An FPGA (Field Programmable Gate Array) that can be programmed after LSI production or a reconfigurable processor that allows reconfiguration of connections and settings of circuit cells inside an LSI after LSI production may also be used.

Moreover, if techniques for realizing circuit integration to replace LSIs should emerge due to progress made in semiconductor technology or due to derivative technology, it is obvious that the functional blocks may be integrated using such techniques. One potential candidate of such a technique is the application of bio-technology.

Finally, each functional block may be realized by software or by a combination of an LSI and software. In addition, the software may be tamper resistant.

(1) Transmitting/Receiving Unit 201

The transmitting/receiving unit 201 includes, for example, a communication device for connecting the server apparatus 101 to the Internet. In addition, the transmitting/receiving unit 201 receives voice information collected by the sound collecting device 102 and a gateway ID from the gateway 103. Furthermore, the transmitting/receiving unit 201 transmits a control instruction for controlling functions of the household electrical appliance 104 to the gateway 103. Examples of a control instruction to the household electrical appliance 104 include an instruction for power ON/OFF, an instruction to switch channels, and an instruction to adjust volume in the case of a television, an instruction for power ON/OFF and an instruction to adjust temperature in the case of an air conditioner, and an instruction to open/close an electric shutter in the case of an electric shutter.

(2) Recognizing Unit 202 and Database Storing Unit 203

The recognizing unit 202 executes a recognition process for analyzing voice information (input voice) received via the transmitting/receiving unit 201 using a voice model and dictionary data stored in the database storing unit 203 and outputs a recognition result. In this case, the server apparatus 101 may recognize voice information using generally used or generally available arbitrary voice recognition technology. Hereinafter, a simple explanation will be provided.

Figure 15:
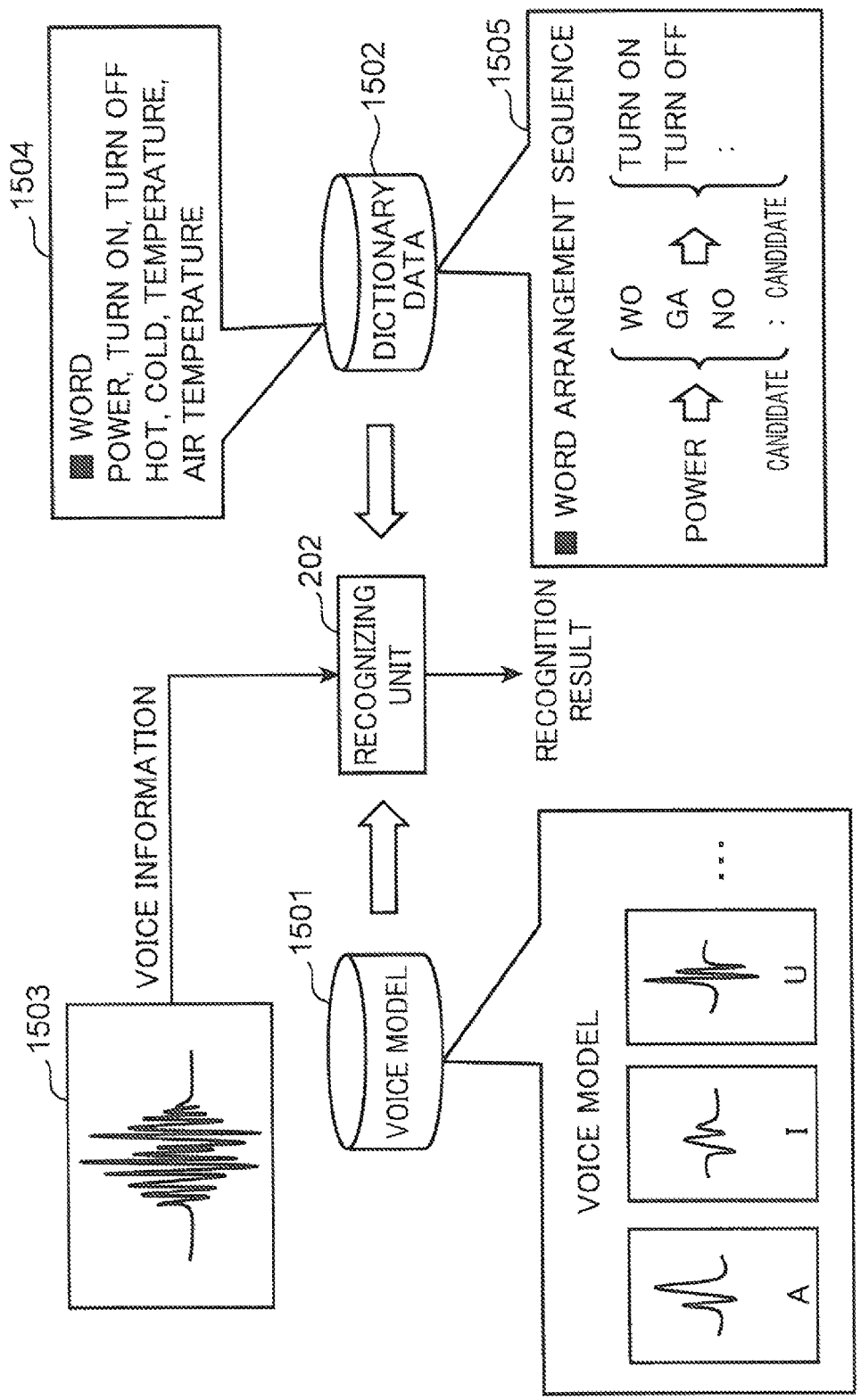
FIG. 15 is a schematic diagram for explaining a recognition process of voice information by a server apparatus according to an embodiment of the present invention.

FIG. 15 is a schematic diagram for explaining a recognition process of voice information by the server apparatus 101. A voice model 1501 is data representing modeled features of a voice waveform. As the voice model 1501, the example in FIG. 15 shows a voice model 1501 of Japanese phonemes such as "a", "i", and "u".

Dictionary data 1502 includes a word database 1504 that stores words as well as an arrangement sequence database 1505 that stores word arrangement sequences of one or more patterns.

In the example of the word database 1504 shown in FIG. 15, Japanese words such as "dengen (power)", "ON", "OFF", "tsukeru (turn on)", "kesu (turn off)", "atsui (hot)", "samui (cold)", "ondo (temperature)", and "kion (air temperature)" are registered.

In addition, in the example of the arrangement sequence database 1505 shown in FIG. 15, Japanese particles "wo", "ga", "no", and the like are listed as word candidates that follow the Japanese word "dengen (power)", and the Japanese words "tsukeru (turn on)", "kesu (turn off)", and the like are listed as word candidates that follow the particle.

First, the recognizing unit 202 detects an arrangement of phonemes in the input voice information 1503 using the voice model 1501. Next, with respect to the detected phoneme arrangement, the recognizing unit 202 refers to the word database 1504 and the arrangement sequence database 1505 and assigns a word to one or more phonemes. In this case, the arrangement sequence database 1505 defines a probability to candidates of each word and the recognizing unit 202 decides a word based on the probabilities. The recognizing unit 202 recognizes the voice information 1503 through such a process.

(3) Control Information Storing Unit 204

The control information storing unit 204 stores a control information table for controlling functions for each household electrical appliance 104.

FIG. 6 is a diagram showing an example of a data configuration of the control information table. In the example of the control information table shown in FIG. 6, "device type" and "control instruction" are stored in association with each other. "Device type" is data that identifies a type of the household electrical appliance 104 such as an air conditioner, a television, and a washing machine. In the example shown in FIG. 6, "power ON", "power OFF", "raise temperature by 1 degree", and the like are stored as control instructions for the air conditioner.

In FIG. 6, as a "control instruction", instruction information for controlling a function may be adopted or a control command itself may be adopted. Moreover, it is to be understood that the device types and control instructions illustrated in FIG. 6 are merely examples. If a household electrical appliance 104 of another type becomes a control object, it is obvious that the device type and control instructions for the household electrical appliance 104 are to be registered in FIG. 6.

(4) Device Management Information Storing Unit 205

The device management information storing unit 205 stores a device management information table for managing the gateway 103, household electrical appliances 104, and types of the household electrical appliances 104 that exist in the same home.

FIG. 7 is a diagram showing an example of a data configuration of the device management information table. The device management information table stores a "gateway ID", a "device ID", and a "device type" in association with each other. A "gateway ID" is an identifier that enables a gateway 103 to be individually identified and, for example, a serial number of the gateway 103 can be adopted. A "device ID" is an identifier that enables household electrical appliances 104 to be individually identified and, for example, a serial number of a household electrical appliance 104 can be adopted. A "device type" is the same as the "device type" shown in FIG. 6.

The example of the device management information table in FIG. 7 shows that the gateway 103 with a gateway ID "32456389" and household electrical appliances 104 with device IDs "123456" and "896023" exist in the same home. It is also shown that the household electrical appliances 104 are, respectively, an "air conditioner" and a "television".

(5) Determining Unit 206

When a recognition result by the recognizing unit 202 of voice information received from the gateway 103 indicates that the voice information relates to control of a household electrical appliance 104, the determining unit 206 uses the device management information table (FIG. 7) stored in the device management information storing unit 205 and a gateway ID received by the transmitting/receiving unit 201 from the gateway 103 to determine whether or not a household electrical appliance 104 of a same device type as the household electrical appliance 104 corresponding to the recognition result exists in the same home as the gateway 103. For example, when a recognition result of voice information transmitted from the gateway 103 with the gateway ID "32456389" is related to control of an "air conditioner", since an "air conditioner" is registered in association with the gateway 103 in the device management information table (FIG. 7), it is determined that an "air conditioner" exists in the same home as the gateway 103.

(6) Control Unit 207

The control unit 207 manages and controls the respective blocks described in (1) to (5) above to realize functions of the server apparatus 101.

1.3 Configuration of Sound Collecting Device 102

Figure 3:
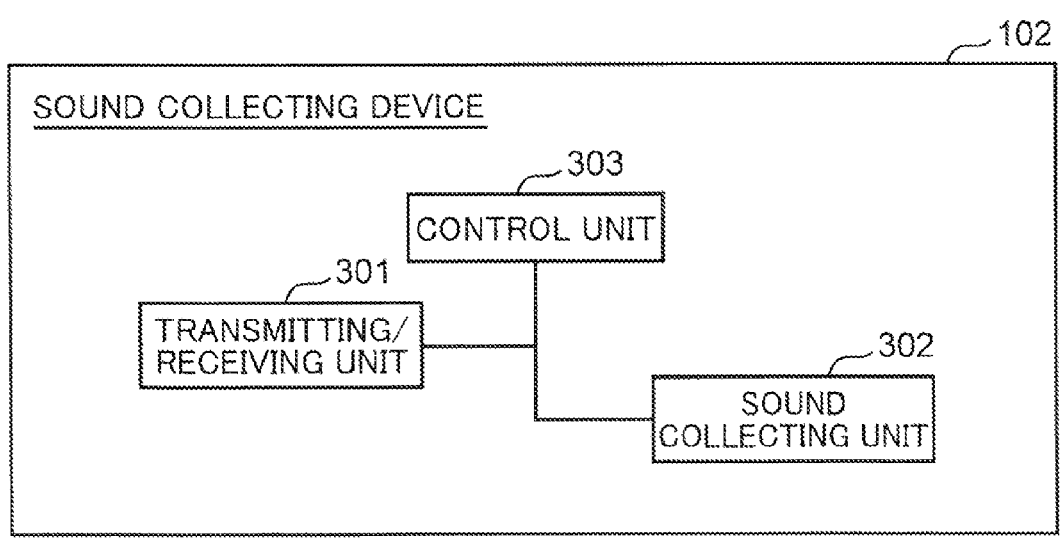
FIG. 3 is a block diagram showing an example of a configuration of a sound collecting device according to an embodiment of the present invention.

Next, a detailed configuration of the sound collecting device 102 will be described. FIG. 3 is a block diagram showing an example of a configuration of the sound collecting device 102.

As shown in FIG. 3, the sound collecting device 102 includes a transmitting/receiving unit 301, a sound collecting unit 302, and a control unit 303.

The sound collecting device 102 is constituted by a microprocessor, a RAM, a ROM, a hard disk, and the like which are not specifically illustrated. A computer program is stored in the RAM, the ROM, and the hard disk. The sound collecting device 102 fulfills its functions as the microprocessor operates in accordance with the computer program.

Moreover, the respective functional blocks of the transmitting/receiving unit 301, the sound collecting unit 302, the control unit 303 and the like may be realized by an LSI that is an integrated circuit. The respective functional blocks may be individually configured as single chips and may include one or more blocks or a part of the respective blocks.

Moreover, while an LSI has been cited herein, other terms such as an IC, a system LSI, a super LSI, or an ultra LSI may be used depending on degrees of integration.

In addition, a method of circuit integration is not limited to an LSI and may be realized using a dedicated circuit or a general-purpose processor. An FPGA (Field Programmable Gate Array) that can be programmed after LSI production or a reconfigurable processor that allows reconfiguration of connections and settings of circuit cells inside an LSI after LSI production may also be used.

Moreover, if techniques for realizing circuit integration to replace LSIs should emerge due to progress made in semiconductor technology or due to derivative technology, it is obvious that the functional blocks may be integrated using such techniques. One potential candidate of such a technique is the application of bio-technology.

Finally, each functional block may be realized by software or by a combination of an LSI and software. In addition, the software may be tamper resistant.

(1) Transmitting/Receiving Unit 301

The transmitting/receiving unit 301 includes a communication device compatible with, for example, an IEEE 802.3 series wired LAN or an IEEE 802.11 series wireless LAN. In addition, the transmitting/receiving unit 301 transmits voice information collected by the sound collecting unit 302 to the gateway 103.

(2) Sound Collecting Unit 302

The sound collecting unit 302 collects a direct voice instruction (for example, "television ON") that is issued by a user to control a household electrical appliance. In addition, the sound collecting unit 302 is also capable of collecting ordinary conversation and the like which are not direct instructions issued by the user to control the household electrical appliance 104. Specifically, the sound collecting unit 302 includes a microphone, a processing unit that processes a voice signal sensed by the microphone, and the like. In this case, for example, the sound collecting unit 302 executes processes involving removing noise and the like from a voice signal output by the microphone and performing analog/digital conversion to generate a digital voice signal. Furthermore, when a voice signal is output by the microphone, the sound collecting unit 302 immediately starts processes such as noise reduction and analog/digital conversion and outputs a processing result to the transmitting/receiving unit 301 whenever necessary.

(3) Control Unit 303

The control unit 303 manages and controls the respective blocks described in (1) and (2) above to realize functions of the sound collecting device 102.

1.4 Configuration of Gateway 103

Figure 4:
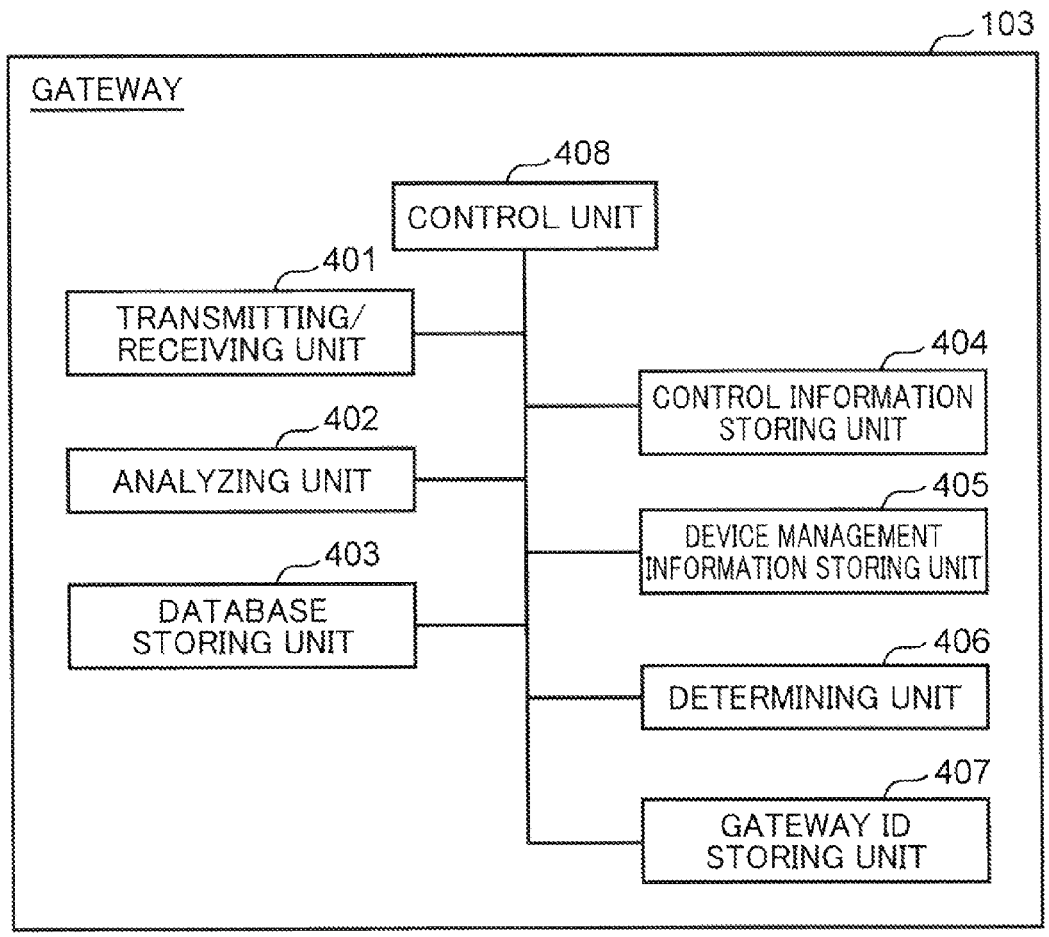
FIG. 4 is a block diagram showing an example of a configuration of a gateway according to an embodiment of the present invention.

Next, a detailed configuration of the gateway 103 will be described. FIG. 4 is a block diagram showing an example of a configuration of the gateway 103.

As shown in FIG. 4, the gateway 103 includes a transmitting/receiving unit 401, an analyzing unit 402, a database storing unit 403, a control information storing unit 404, a device management information storing unit 405, a determining unit 406, a gateway ID storing unit 407, and a control unit 408.

The gateway 103 is constituted by a microprocessor, a RAM, a ROM, a hard disk, and the like which are not specifically illustrated. A computer program is stored in the RAM, the ROM, and the hard disk. The gateway 103 fulfills its functions as the microprocessor operates in accordance with the computer program.

Moreover, the respective functional blocks of the transmitting/receiving unit 401, the analyzing unit 402, the database storing unit 403, the control information storing unit 404, the device management information storing unit 405, the determining unit 406, the gateway ID storing unit 407, the control unit 408 and the like may be realized by an LSI that is an integrated circuit. The respective functional blocks may be individually configured as single chips and may include one or more blocks or a part of the respective blocks.

Moreover, while an LSI has been cited herein, other terms such as an IC, a system LSI, a super LSI, or an ultra LSI may be used depending on degrees of integration.

In addition, a method of circuit integration is not limited to an LSI and may be realized using a dedicated circuit or a general-purpose processor. An FPGA (Field Programmable Gate Array) that can be programmed after LSI production or a reconfigurable processor that allows reconfiguration of connections and settings of circuit cells inside an LSI after LSI production may also be used.

Furthermore, if techniques for realizing circuit integration to replace LSIs should emerge due to progress made in semiconductor technology or due to derivative technology, it is obvious that the functional blocks may be integrated using such techniques. One potential candidate of such a technique is the application of bio-technology.

Finally, each functional block may be realized by software or by a combination of an LSI and software. In addition, the software may be tamper resistant.

(1) Transmitting/Receiving Unit 401

The transmitting/receiving unit 401 includes a communication device that connects the gateway 103 to an internal network and a communication device that connects the gateway 103 to an external network. The transmitting/receiving unit 401 receives voice information collected by the sound collecting device 102 via the internal network from the sound collecting device 102. In addition, the transmitting/receiving unit 401 transmits a control instruction for controlling functions of the household electrical appliance 104 to the household electrical appliance 104 via the internal network. Furthermore, the transmitting/receiving unit 401 transmits voice information for requesting a recognition process to the server apparatus 101 via the external network. Moreover, the transmitting/receiving unit 401 receives a control instruction for the household electrical appliance 104 from the server apparatus 101 via the external network and transmits the control instruction to the object household electrical appliance 104.

Examples of the control instruction to the household electrical appliance 104 include an instruction for power ON/OFF, an instruction to switch channels, and an instruction to adjust volume in the case of a television and an instruction for power ON/OFF and an instruction to adjust temperature in the case of an air conditioner.

(2) Analyzing Unit 402 and Database Storing Unit 403

The analyzing unit 402 analyzes voice information (input voice) received by the transmitting/receiving unit 401 from the sound collecting device 102 using a voice model and dictionary data stored in the database storing unit 403 and outputs an analysis result. In this case, the analyzing unit 402 may analyze voice information using generally used or generally available arbitrary voice recognition technology. Hereinafter, a simple explanation will be provided.

Figure 14:
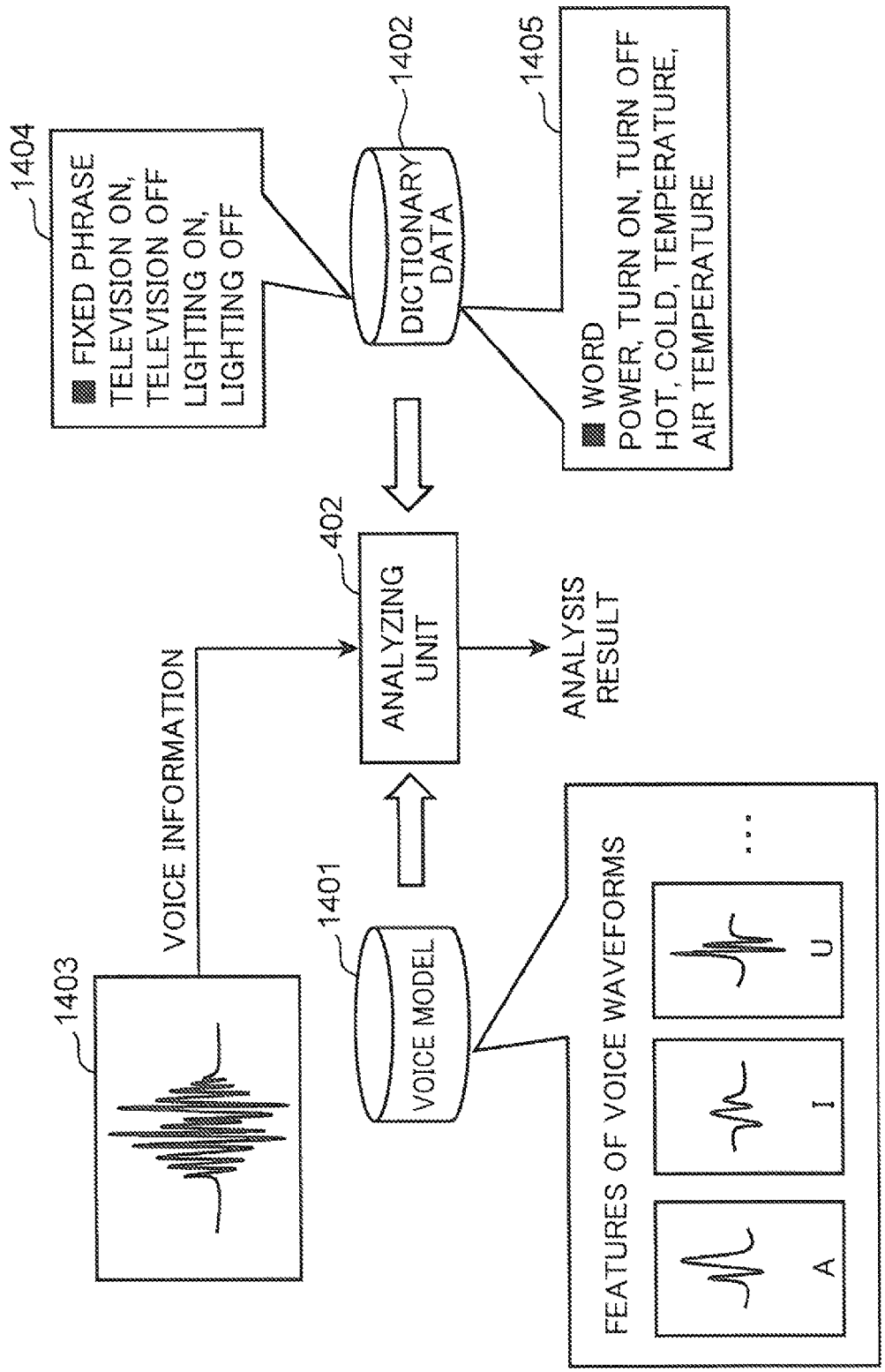
FIG. 14 is a schematic diagram for explaining an analysis process of voice information by a gateway according to an embodiment of the present invention.

FIG. 14 is a schematic diagram for explaining an analysis process of voice information by the gateway 103. A voice model 1401 is data representing modeled features of a voice waveform in a similar manner to the voice model 1501 shown in FIG. 15.

The dictionary data 1402 includes a fixed phrase database 1404 that stores one or more fixed phrases related to control of the household electrical appliance 104 and a word database 1405 that stores words as described earlier. Moreover, the dictionary data 1402 may also include an arrangement sequence database that stores word arrangement sequences of one or more patterns.

The fixed phrase database 1404 stores phrases that enable a household electrical appliance 104 that is a control object and a control instruction with respect to the household electrical appliance 104 to be clearly understood such as "television ON", "television OFF", "channel 2", "lighting ON", "lighting OFF", "air conditioner ON", and "air conditioner OFF".

The word database 1405 stores words used when controlling the household electrical appliance 104 such as "power", "ON", "OFF", "turn on", "turn off", "temperature", and "air temperature" as well as words that suggest control of the household electrical appliance 104 such as "hot", "cold", and "dark".

First, the analyzing unit 402 detects an arrangement of phonemes in the input voice information 1403 using the voice model 1401. Next, with respect to the detected phoneme arrangement, the analyzing unit 402 refers to the word database 1405 and assigns a word to one or more phonemes. When a phrase obtained from the assigned words matches any one fixed phrase stored in the fixed phrase database 1404, the input voice information is judged to be a fixed phrase.

On the other hand, when a phrase formed by assigning words to the detected phoneme arrangement does not correspond to any of the fixed phrases stored in the fixed phrase database 1404, the analyzing unit 402 judges that the input voice information is a word related to control of a household electrical appliance. In this case, since words related to control of the household electrical appliance 104 are registered in the word database 1405, when words cannot be assigned to the detected phoneme arrangement, the analyzing unit 402 may judge that the input voice information is neither a word related to control of the household electrical appliance 104 nor a fixed phrase.

Moreover, the number of words registered in the word database 1405 stored in the gateway 103 is significantly smaller than the number of words registered in the word database 1504 stored in the server apparatus 101. In addition, even if a mode in which the gateway 103 stores an arrangement sequence database is adopted, the number of arrangement sequence patterns stored in the arrangement sequence database is significantly smaller than the number of arrangement sequence patterns stored in the arrangement sequence database 1505 stored in the server. Furthermore, the number of registered voice models and the number of pieces of data constituting one voice model in the voice model 1401 stored in the gateway 103 are significantly smaller than the number of registered voice models and the number of pieces of data constituting one voice model in the voice model 1501 stored in the server apparatus 101. Therefore, the server apparatus 101 realizes a recognition process of voice information at a higher level than the gateway 103.

When the analysis result of the voice information is a fixed phrase related to control of the household electrical appliance 104, the analyzing unit 402 judges not to transmit the voice information to the server apparatus 101 and notifies an analysis result (fixed phrase) to the determining unit 406. In this case, the gateway 103 performs a process for associating the fixed phrase with a control instruction for controlling the household electrical appliance 104.

On the other hand, when the analysis result is not a fixed phrase related to control of the household electrical appliance 104 but includes a word related to control of the household electrical appliance 104, the analyzing unit 402 judges to transmit the voice information to the server apparatus 101 and transmits the voice information to the server apparatus 101 via the transmitting/receiving unit 401. In this case, the server apparatus 101 performs a recognition process of the received voice information.

Moreover, when a new fixed phrase and a new word are transmitted from the server apparatus 101, the database storing unit 403 may add the fixed phrase and the word to dictionary data (fixed phrases and words) stored in the database storing unit 403. Details will be described later.

(3) Control Information Storing Unit 404

The control information storing unit 404 stores a control information table for controlling functions of each household electrical appliance 104.

FIG. 8 is a diagram showing an example of a data configuration of the control information table stored in the control information storing unit 404. In the example of the control information table shown in FIG. 8, "device type", "control instruction", and "fixed phrase" are stored in association with each other. A "device type" is the same as the "device type" shown in FIG. 6. A "control instruction" is the same as the "control instruction" shown in FIG. 6. A "fixed phrase" is a phrase that enables a household electrical appliance 104 that is a control object and a control instruction with respect to the household electrical appliance 104 to be clearly understood. Fixed phrases that are stored in the control information table are also stored in the fixed phrase database 1404 shown in FIG. 14.

In the example shown in FIG. 8, "power ON", "power OFF", "raise temperature by 1 degree", and the like are registered as control instructions corresponding to the air conditioner. In addition, in the example shown in FIG. 8, "air conditioner ON", "turn on air conditioner", and the like are registered as fixed phrases corresponding to power ON of the air conditioner, and "air conditioner OFF", "turn off air conditioner", and the like are registered as fixed phrases corresponding to power OFF of the air conditioner. In this case, as a "control instruction" to be registered in the control information table, instruction information for controlling a function may be adopted or a control command itself may be adopted. Furthermore, while an air conditioner and a television are illustrated as device types in the example shown in FIG. 8, when a household electrical appliance 104 of another type is installed in the home of the user, the device type of the household electrical appliance 104, and a control instruction and a fixed phrase for the household electrical appliance 104 are to be registered in the control information table.

(4) Device Management Information Storing Unit 405

The device management information storing unit 405 stores a device management information table for managing household electrical appliances 104 and device types of the household electrical appliances 104 that exist in the same home as the gateway 103.

FIG. 9 is a diagram showing an example of a data configuration of the device management information table. In the example of the device management information table shown in FIG. 9, a "device ID" and a "device type" are stored in association with each other. A "device ID" is an identifier that enables the household electrical appliance 104 existing in the same home as the gateway 103 to be individually identified and, for example, a serial number of the household electrical appliance 104 can be adopted. A "device type" is data for identifying a type of a household electrical appliance.

The example in FIG. 9 shows that the household electrical appliances 104 with the device IDs "123456" and "896023" exist in the same home as the gateway 103. It is also shown that the household electrical appliances 104 are, respectively, an "air conditioner" and a "television". Furthermore, while an air conditioner and a television are illustrated as device types in the example shown in FIG. 9, when a household electrical appliance 104 of another type is installed in the home of the user, a device ID and a device type of the household electrical appliance 104 are to be registered in the control information table.

(5) Determining Unit 406

When an analysis result of a fixed phrase is notified from the analyzing unit 402, the determining unit 406 determines whether or not the household electrical appliance 104 corresponding to the analysis result exists in the same home as the gateway 103 using the device management information table stored in the device management information storing unit 405. Subsequently, when the determining unit 406 determines that the corresponding household electrical appliance 104 exists in the same home, the determining unit 406 decides a control instruction corresponding to the analysis result (fixed phrase) using the control information table stored in the control information storing unit 404. The determining unit 406 transmits the decided control instruction to the household electrical appliance 104 determined to exist in the same home via the transmitting/receiving unit 401.

For example, assuming that an analysis result of "air conditioner ON" is notified from the analyzing unit 402, the determining unit 406 checks whether or not an air conditioner is registered in "device type" of the device management information table (FIG. 9). In the example shown in FIG. 9, since an air conditioner is registered in "device type", the determining unit 406 determines that the household electrical appliance 104 corresponding to the analysis result exists in the same home as the gateway 103. Next, the determining unit 406 identifies a control instruction corresponding to "air conditioner ON" using the control information table (FIG. 8). In the example shown in FIG. 8, since a control instruction of "power ON" is associated with a fixed phrase reading "air conditioner ON", the determining unit 406 decides that "power ON" is the control instruction of the air conditioner and hands over the control instruction to the transmitting/receiving unit 401. The transmitting/receiving unit 401 to which the control instruction "power ON" of the air conditioner is handed over transmits the control instruction "power ON" to the household electrical appliance 104 of the air conditioner. Accordingly, the power of the air conditioner is turned on.

(6) Gateway ID Storing Unit 407

The gateway ID storing unit 407 stores an identifier (gateway ID) capable of uniquely identifying the gateway.

(7) Control Unit 408

The control unit 408 manages and controls the respective blocks described in (1) to (6) above to realize functions of the gateway 103.

1.5 Configuration of Household Electrical Appliance 104

Figure 5:
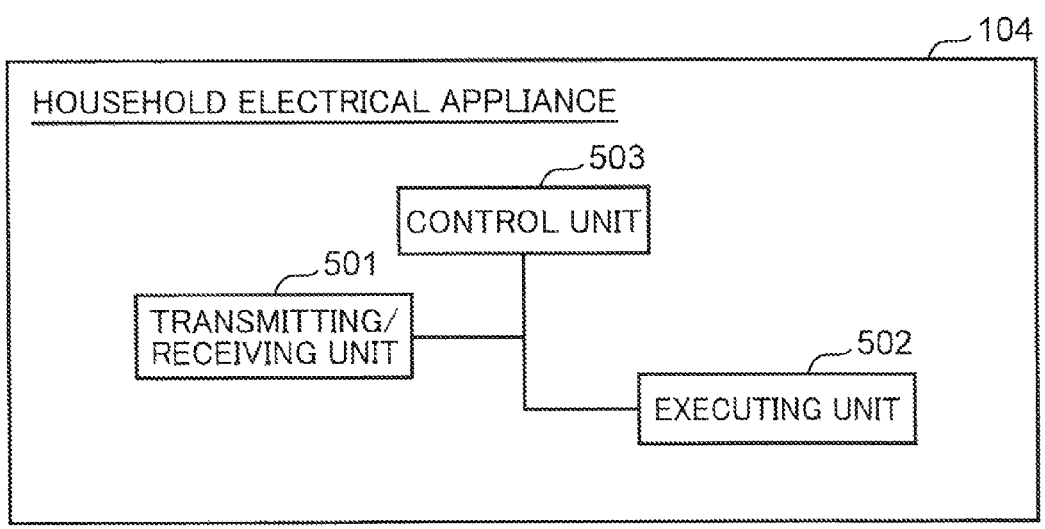
FIG. 5 is a block diagram showing an example of a configuration of a household electrical appliance according to an embodiment of the present invention.

Next, a detailed configuration of the household electrical appliance 104 will be described. FIG. 5 is a block diagram showing an example of a configuration of the household electrical appliance 104. As shown in FIG. 5, the household electrical appliance 104 includes a transmitting/receiving unit 501, an executing unit 502, and a control unit 503.

The household electrical appliance 104 is constituted by a microprocessor, a RAM, a ROM, a hard disk, and the like which are not specifically illustrated. A computer program is stored in the RAM, the ROM, and the hard disk. The household electrical appliance 104 fulfills its functions as the microprocessor operates in accordance with the computer program.

Moreover, the respective functional blocks of the transmitting/receiving unit 501, the executing unit 502, the control unit 503 and the like may be realized by an LSI that is an integrated circuit. The respective functional blocks may be individually configured as single chips and may include one or more blocks or a part of the respective blocks.

Moreover, while an LSI has been cited herein, other terms such as an IC, a system LSI, a super LSI, or an ultra LSI may be used depending on degrees of integration.

In addition, a method of circuit integration is not limited to an LSI and may be realized using a dedicated circuit or a general-purpose processor. An FPGA (Field Programmable Gate Array) that can be programmed after LSI production or a reconfigurable processor that allows reconfiguration of connections and settings of circuit cells inside an LSI after LSI production may also be used.

Moreover, if techniques for realizing circuit integration to replace LSIs should emerge due to progress made in semiconductor technology or due to derivative technology, it is obvious that the functional blocks may be integrated using such techniques. One potential candidate of such a technique is the application of bio-technology.

Finally, each functional block may be realized by software or by a combination of an LSI and software. In addition, the software may be tamper resistant.

(1) Transmitting/Receiving Unit 501

The transmitting/receiving unit 501 includes a communication device that connects the household electrical appliance 104 to an internal network. In addition, the transmitting/receiving unit 501 receives a control instruction that is transmitted from the gateway 103 via the internal network.

In this case, as a control instruction, instruction information for controlling a function may be adopted or a control command itself may be adopted.

(2) Executing Unit 502

The executing unit 502 executes a process based on the control instruction received by the transmitting/receiving unit 501. For example, when the household electrical appliance 104 is an air conditioner, the power of the air conditioner is turned on or turned off or the temperature of the air conditioner is adjusted.

(3) Control Unit 503

The control unit 503 manages and controls the respective blocks described in (1) and (2) above to realize functions of the household electrical appliance 104.

1.6 Operations of Household Electrical Appliance Control System

Examples of operations of the household electrical appliance control system in a case where the sound collecting device 102 collects voice information and the gateway 103 or the server apparatus 101 transmits a control instruction to the household electrical appliance 104 will be described with reference to FIGS. 10 to 13.

First, upon sensing a voice signal, the sound collecting unit 302 of the sound collecting device 102 generates voice information from the sensed voice signal and transmits the voice information to the gateway 103 via the transmitting/receiving unit 301 (step S1001).

The gateway 103 receives the voice information via the transmitting/receiving unit 401 (step S1002). Next, the analyzing unit 402 of the gateway 103 analyzes whether or not the received voice information is a fixed phrase using the voice model 1401 and the dictionary data 1402 stored in the database storing unit 403 (step S1003).

Figure 11:
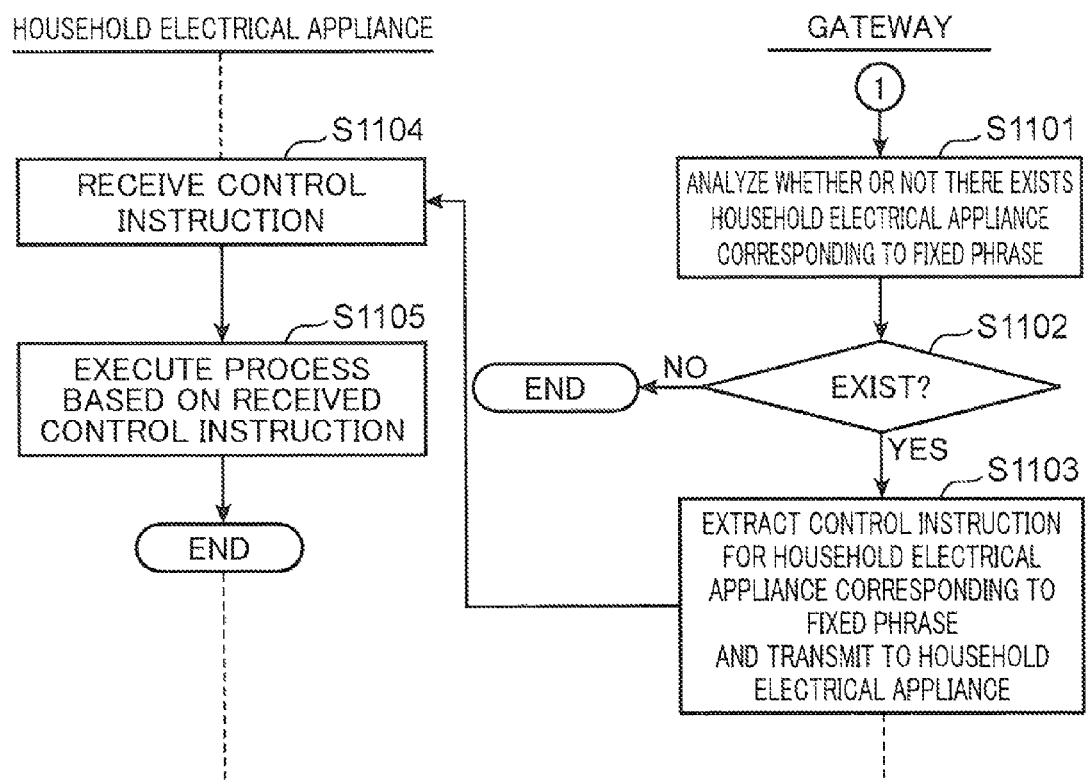
FIG. 11 is a flow chart showing an example of operations of a household electrical appliance control system when a sound collecting device collects voice information and a gateway or a server apparatus transmits a control instruction to a household electrical appliance according to an embodiment of the present invention.

When the analysis result by the analyzing unit 402 is a fixed phrase (Yes in step S1004), the process is advanced to step S1101 shown in FIG. 11. In step S1101, the determining unit 406 determines whether or not the household electrical appliance 104 corresponding to the fixed phrase exists in the same home as the gateway 103 using the device management information table (FIG. 9) stored in the device management information storing unit 405 (step S1101).

When it is determined in step S1102 that the household electrical appliance 104 does not exist in the same home (No in step S1102), the process is terminated. On the other hand, when it is determined in step S1102 that the household electrical appliance 104 exists in the same home (Yes in step S1102), the determining unit 406 uses the control information table (FIG. 8) stored in the control information storing unit 404 to extract a control instruction for the household electrical appliance 104 corresponding to the fixed phrase indicated by the analysis result and transmits the control instruction to the household electrical appliance 104 via the transmitting/receiving unit 401 (step S1103). For example, when the analysis result is a fixed phrase reading "air conditioner ON", "power ON" of an air conditioner is extracted as a control instruction.

Next, the transmitting/receiving unit 501 of the household electrical appliance 104 receives the control instruction (step S1104) and the executing unit 502 executes a process using the received control instruction (step S1105). For example, when the analysis result is a fixed phrase reading "air conditioner ON", the control instruction "power ON" is transmitted to the air conditioner. Subsequently, the air conditioner receives the control instruction "power ON" and turns its power on.

Figure 10:
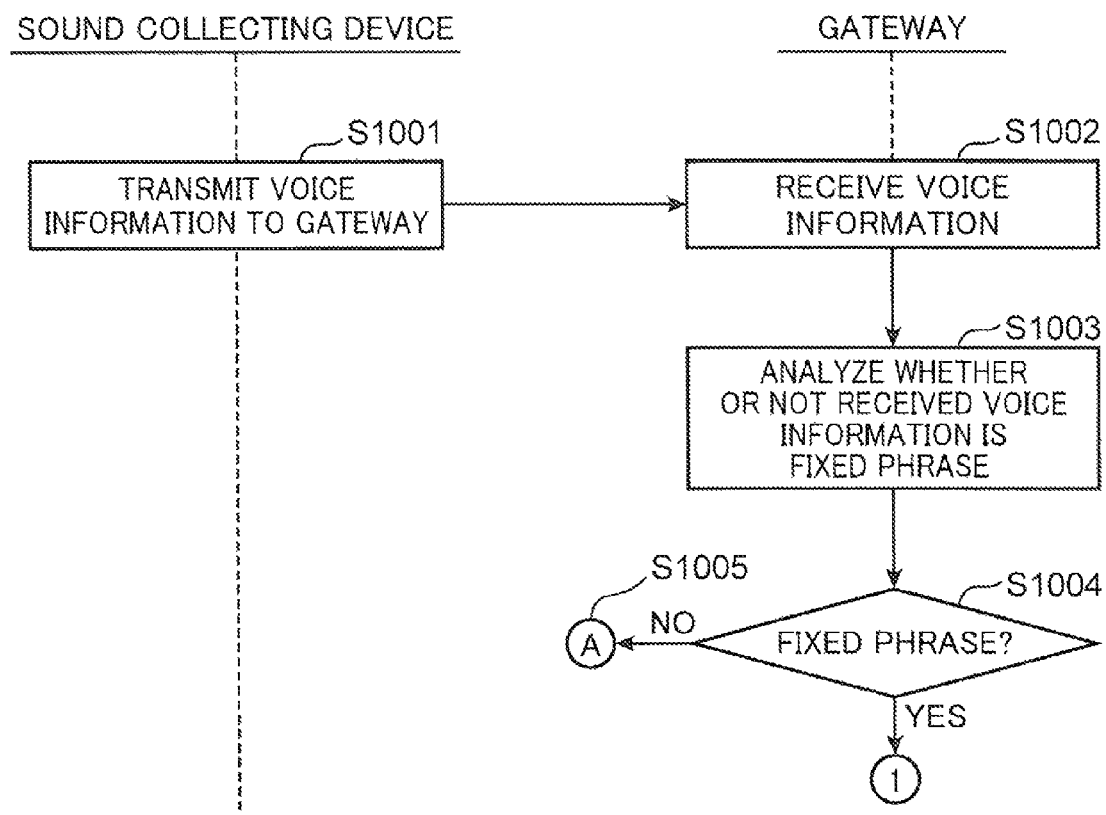
FIG. 10 is a flow chart showing an example of operations of a household electrical appliance control system when a sound collecting device collects voice information and a gateway or a server apparatus transmits a control instruction to a household electrical appliance according to an embodiment of the present invention.
Figure 12:
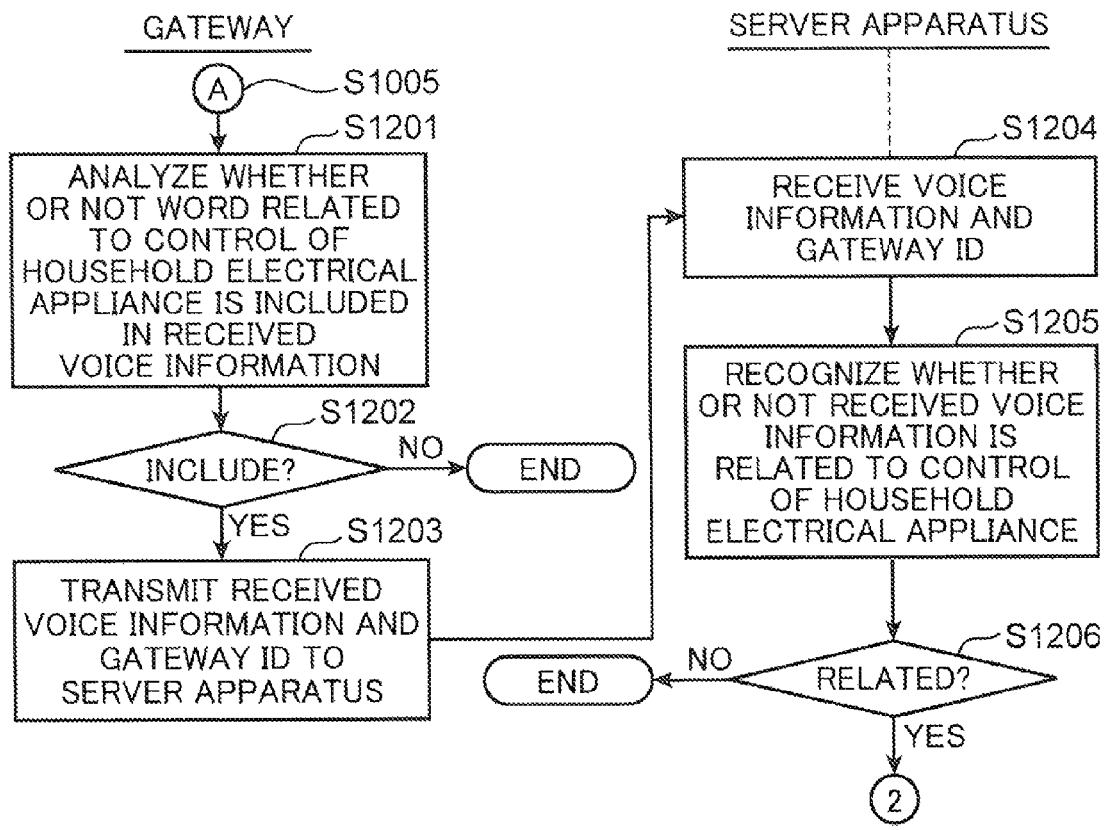
FIG. 12 is a flow chart showing an example of operations of a household electrical appliance control system when a sound collecting device collects voice information and a gateway or a server apparatus transmits a control instruction to a household electrical appliance according to an embodiment of the present invention.
Figure 13:
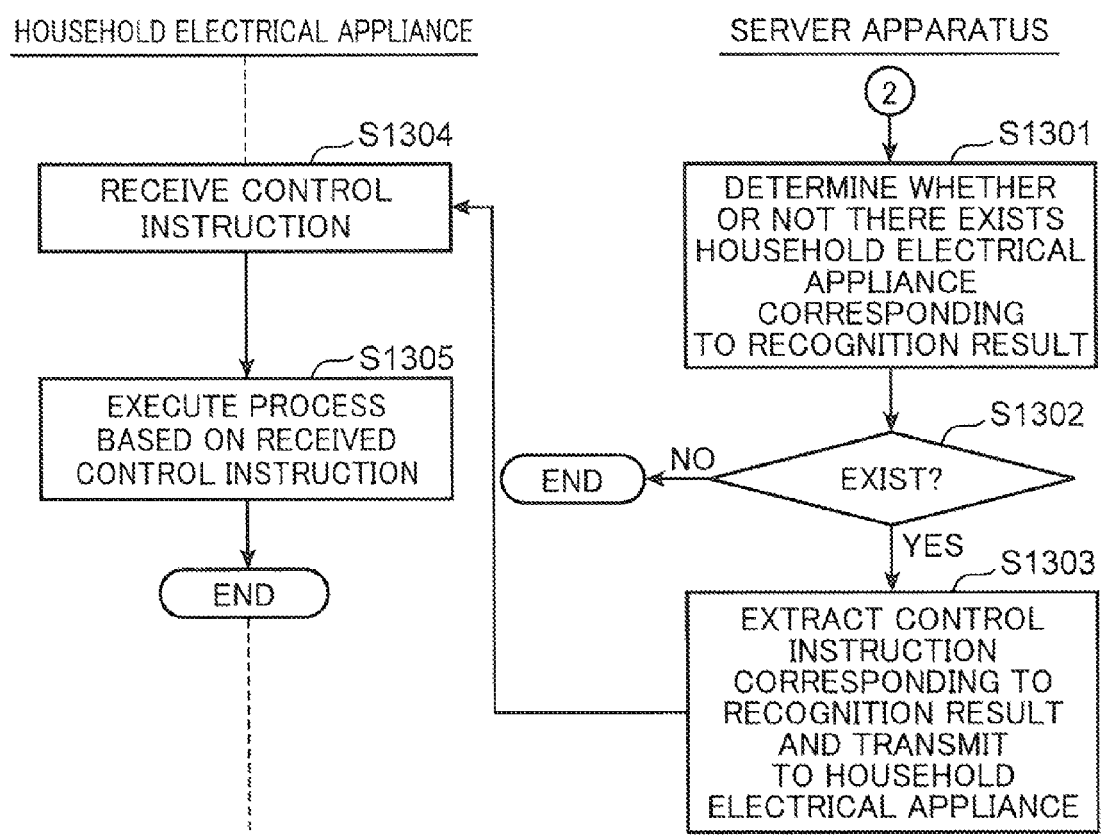
FIG. 13 is a flow chart showing an example of operations of a household electrical appliance control system when a sound collecting device collects voice information and a gateway or a server apparatus transmits a control instruction to a household electrical appliance according to an embodiment of the present invention.

In step S1004 shown in FIG. 10, when the analyzing unit 402 of the gateway 103 determines that the analysis result is not a fixed phrase (No in step S1004), the process is advanced to step S1201 in FIG. 12 (step S1005). In step S1201, the analyzing unit 402 analyzes whether or not the received voice information includes a word related to control of the household electrical appliance 104 using the voice model 1401 and the dictionary data 1402 stored in the database storing unit 403 (step S1201). When the analyzing unit 402 determines that a word related to control of the household electrical appliance 104 is not included (No in step S1202), the process is terminated. On the other hand, when it is determined in step S1202 that a word related to control of the household electrical appliance 104 is included (Yes in step S1202), the analyzing unit 402 associates the received voice information and a gateway ID stored in the gateway ID storing unit 407 with each other and transmits the associated received voice information and the gateway ID to the server apparatus 101 via the transmitting/receiving unit 401 (step S1203).

When the transmitting/receiving unit 201 of the server apparatus 101 receives the voice information and the gateway ID (step S1204), the recognizing unit 202 recognizes whether or not the received voice information is related to control of the household electrical appliance 104 using the voice model 1501 and the dictionary data 1502 stored in the database storing unit 203 (step S1205).

In step S1206, when it is determined that the received voice information is not related to control of the household electrical appliance 104 (No in step S1206), the process is terminated. On the other hand, in step S1206, when the determining unit 206 determines that the received voice information is voice information is related to control of the household electrical appliance 104 (Yes in step S1206), the process is advanced to step S1301 shown in FIG. 13.

In step S1301, the determining unit 206 determines whether or not there exists a household electrical appliance 104 corresponding to the recognition result by the recognizing unit 202 using the device management information table (FIG. 7) stored in the device management information storing unit 205 and the received gateway ID (step S1302).

In step S1302, when the determining unit 206 determines that a corresponding household electrical appliance 104 does not exist (No in step S1302), the process is terminated. On the other hand, when the determining unit 206 determines that a corresponding household electrical appliance 104 exists (Yes in step S1302), the process is advanced to step S1303.

Let us assume that, for example, the word "hot" is included in the recognition result of the voice information by the recognizing unit 202. Since "hot" is a word related to the temperature of a room, the determining unit 206 determines that the household electrical appliance 104 corresponding to "hot" is an air conditioner. In addition, when an air conditioner is not registered as a "device type" corresponding to the gateway ID that is an object in the device management information table (FIG. 7), the determining unit 206 may make a determination of No in step S1306. On the other hand, when an air conditioner is registered as a "device type" corresponding to the gateway ID that is an object in the device management information table (FIG. 7), the determining unit 206 may make a determination of Yes in step S1302.

In step S1303, the determining unit 206 decides a control instruction for the household electrical appliance 104 corresponding to the recognition result by the recognizing unit 202 using the control information table (FIG. 6) stored in the control information storing unit 204 and transmits the control instruction to the household electrical appliance 104 via the transmitting/receiving unit 201 (step S1303). Moreover, the control instruction transmitted by the server apparatus 101 is transmitted to the household electrical appliance 104 via the gateway 103.

For example, let us assume that the household electrical appliance 104 corresponding to the recognition result by the recognizing unit 202 is an air conditioner. In this case, the determining unit 206 may decide any of the control instructions among "control instructions" associated with an air conditioner in the control information table (FIG. 6). For example, let us assume that the word "power ON" is included in the recognition result by the recognizing unit 202 in addition to "hot". In this case, the determining unit 206 may decide "power ON" as the control instruction. Subsequently, the determining unit 206 may transmit the control instruction "power ON" of the air conditioner to the gateway 103 that is an object via the transmitting/receiving unit 501.

In step S1304, the household electrical appliance 104 receives the control instruction via the transmitting/receiving unit 501 (step S1304) and the executing unit 502 executes a process based on the received control instruction (step S1305). For example, assuming that the gateway 103 receives the control instruction "power ON" of the air conditioner, the gateway 103 transmits the control instruction to the air conditioner that is the control object. When the transmitting/receiving unit 501 receives the control instruction, the executing unit 502 of the air conditioner executes a process for turning on the power of the air conditioner.

<Modifications>

The present embodiment can adopt the following modifications.

(1) Upon performing a simplified analysis of voice information, when the gateway 103 determines that (a) further detailed analysis by the server apparatus 101 is necessary or (b) other states or situations such as peripheral devices and surrounding environment must also be taken into consideration, the gateway 103 may transmit the received voice information to the server apparatus 101. On the other hand, when the gateway 103 determines that neither (a) nor (b) are applicable, the gateway 103 may decide a control instruction by itself and transmit the control instruction to the household electrical appliance 104.

For example, when the gateway 103 is able to analyze a word "atsui" from the voice information as a result of a simplified analysis, it is unclear as to whether "atsui" refers to "hot (atsui)" with respect to the temperature in a room or "hot (atsui)" with respect to the temperature of food. In this case, the gateway 103 may determine that either (a) or (b) is applicable.

Subsequently, the server apparatus 101 may analyze nuance, tone, context, and the like in the received voice information to understand the intention of the user and decide a control instruction. Furthermore, in this case, the server apparatus 101 may cause the gateway 103 to transmit environmental information of the surroundings in addition to voice information and may decide a control instruction by also taking the environmental information into consideration. In this case, as the environmental information, for example, information on temperature and humidity inside the home in which the gateway 103 is installed, information indicating whether or not a person is present in the home, information indicating the presence/absence or a type of a running household electrical appliance 104, and surface temperature of each person can be adopted.

For example, if the word "hot" is included in the recognition result of the voice information and the air conditioner is not turned on, the server apparatus 101 may decide a control instruction for turning on the power of the air conditioner in a cooler mode.

In addition, for example, if the word "cold" is included in the recognition result of the voice information and the air conditioner is not turned on, the server apparatus 101 may decide a control instruction for turning on the power of the air conditioner in a heater mode.

Furthermore, for example, if the word "hot" is included in the recognition result of the voice information and the air conditioner is turned on, the server apparatus 101 may decide a control instruction for lowering the temperature of the air conditioner.

In addition, for example, if the word "cold" is included in the recognition result of the voice information and the air conditioner is turned on, the server apparatus 101 may decide a control instruction for raising the temperature of the air conditioner.

Furthermore, for example, if the recognition result of the voice information includes the word "power ON" and makes a reference to a television, the server apparatus 101 may decide power ON of the television as a control instruction.

Moreover, the gateway 103 may acquire information on the temperature and the humidity in the home by, for example, making an inquiry to the air conditioner for information on the temperature and the humidity, causing a temperature sensor and a humidity sensor included in the air conditioner to sense the temperature and the humidity in the home, and acquiring sensing results.

In addition, for example, when a security system is installed in the home and the security system is set to an "out-of-home" mode, the gateway 103 may determine that no one is at home, and when the security system is set to an "at-home" mode, the gateway 103 may determine that someone is at home. Alternatively, for example, when a smart distribution panel is installed in the home, the gateway 103 may determine whether or not a person is in the home based on changes in power consumption that is sensed by the smart distribution panel.

Furthermore, the gateway 103 may transmit status confirmation information to each household electrical appliance 104 and determine the presence/absence of a household electrical appliance 104 in operation from a confirmation result sent back from each household electrical appliance 104.

In addition, for example, when an air conditioner is equipped with a function for measuring a surface temperature of a person, the gateway 103 may cause the air conditioner to sense the surface temperature of a person and acquire the surface temperature of the person.

(2) The sound collecting device 102 may be built into the household electrical appliance 104 as a sound collecting function or may be built into the gateway 103 as a sound collecting function. In the former case, the gateway 103 is to acquire voice information from each household electrical appliance 104. Meanwhile, in the latter case, the gateway 103 is to acquire voice information from a voice uttered by the user through the gateway.

Alternatively, the sound collecting device 102 may be respectively built into the household electrical appliance 104 and the gateway 103. Alternatively, after respectively incorporating a sound collecting function of the sound collecting device 102 into the household electrical appliance 104 and the gateway 103, the sound collecting device 102 may be provided independently of the household electrical appliance 104 and the gateway 103.

In addition, for example, the sound collecting device 102 may be constituted by a dedicated device embedded in a ceiling of a room or erected from a floor of the room or may be constituted by a microphone and an application provided in a mobile terminal (for example, a smartphone, a mobile phone, or a tablet terminal) that is carried by the user.

(3) When the household electrical appliance 104 recognizes that the user is talking to the household electrical appliance 104, the household electrical appliance 104 may transmit all voice information uttered by the user to the server apparatus 101, and when a plurality of users are engaged in a conversation, the household electrical appliance 104 may transmit voice information of the entire conversation to the server apparatus 101. Alternatively, when the household electrical appliance 104 performs a simplified analysis of voice information and determines that the voice information is related to control of the household electrical appliance 104, the household electrical appliance 104 may transmit the voice information to the gateway 103.

In this case, the household electrical appliance 104 may determine whether or not "a user is talking to the household electrical appliance 104" by methods described below. Examples that can be adopted include detecting whether or not the face of a user is turned toward the household electrical appliance 104, detecting whether or not the user has operated a remote controller of the household electrical appliance 104, and detecting a gesture made by the user such as waving a hand toward the household electrical appliance 104.

The household electrical appliance 104 may determine whether or not the face of a user is turned toward the household electrical appliance 104 based on whether or not a line of sight of the user is directed toward the household electrical appliance 104. In this case, the household electrical appliance 104 may irradiate the face of the user with infrared light and capture the face of the user with an infrared camera, detect a cornea reflection position, a pupil position, and the like from an obtained image, and sense a line of sight of the user from such positional relationships. Subsequently, when the household electrical appliance 104 is positioned on an extended line of the sensed line of sight of the user, the household electrical appliance 104 may determine that the user is facing the household electrical appliance 104.

In addition, the household electrical appliance 104 may determine whether or not the user is making a gesture toward the household electrical appliance 104 by using a gesture recognizing apparatus.

(4) When the gateway 103 transmits voice information to the server apparatus 101, in addition to voice information including a word related to control of the household electrical appliance 104, the gateway 103 may also transmit preceding and succeeding voice information (for example, voice information preceding and succeeding by 1 minute). Accordingly, the server apparatus 101 can more accurately understand the intentions of the user based on the preceding and succeeding voice information.

(5) After transmitting a control instruction to the household electrical appliance 104, the server apparatus 101 may present contents of the control instruction to the user on an input apparatus having a display, and the household electrical appliance 104 may execute the control instruction upon obtaining permission by the user. In this case, the input apparatus is an apparatus equipped with a function that enables communication with the gateway 103 via a home network, a sound collecting function such as a microphone, and the like and, for example, a television or a smartphone can be adopted. Moreover, the input apparatus may be built into the gateway 103 or built into the household electrical appliance 104.

Figure 16:
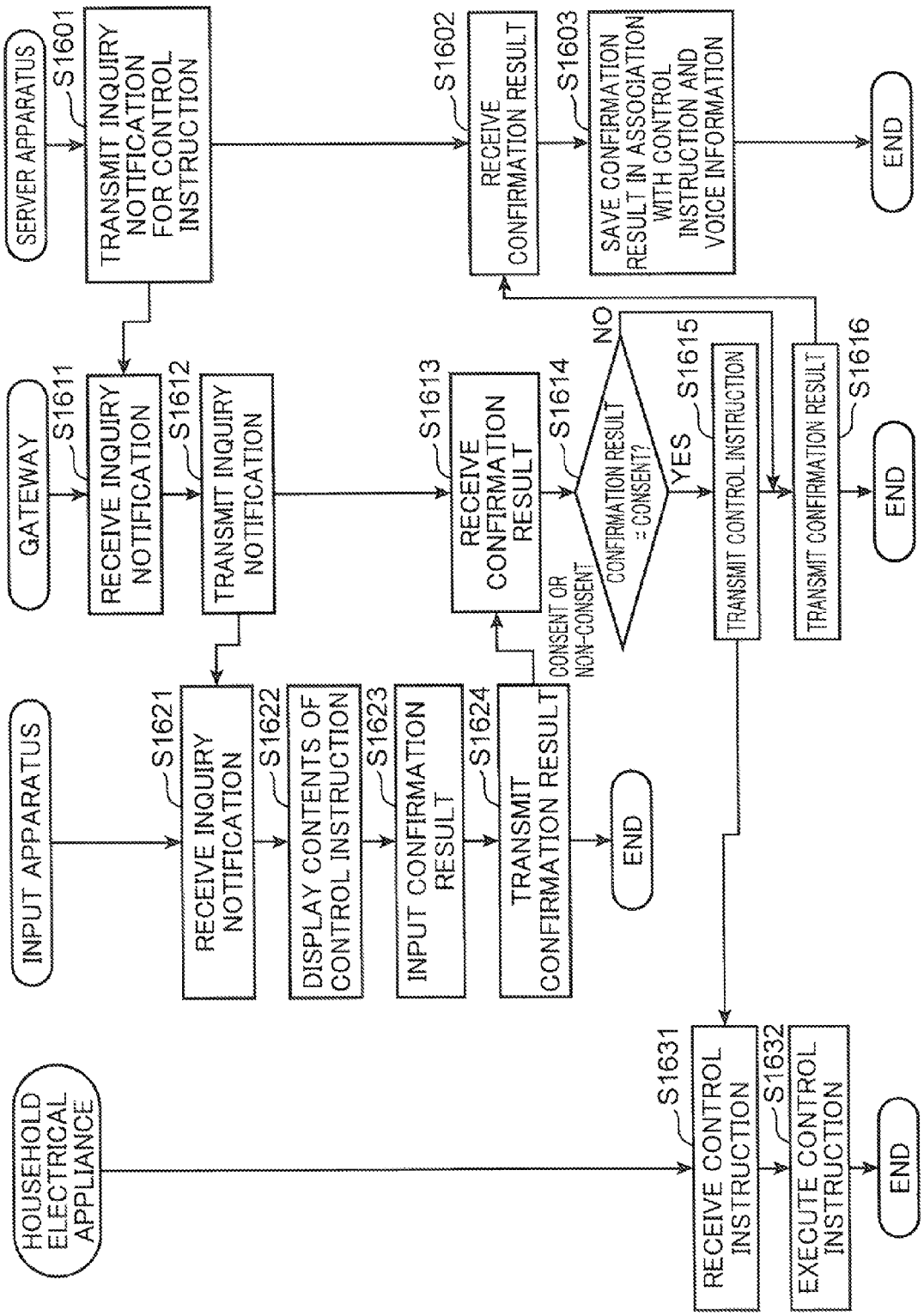
FIG. 16 is a flow chart of a modification of an embodiment of the present invention.

Hereinafter, this modification will be described. FIG. 16 is a flow chart of a modification of an embodiment of the present invention. First, when the determining unit 206 of the server apparatus 101 decides a control instruction based on voice information transmitted from the gateway 103, the determining unit 206 transmits an inquiry notification for making an inquiry to the user regarding whether or not the decided control instruction is correct to the gateway 103 via the transmitting/receiving unit 201 (step S1601).

Figure 17:
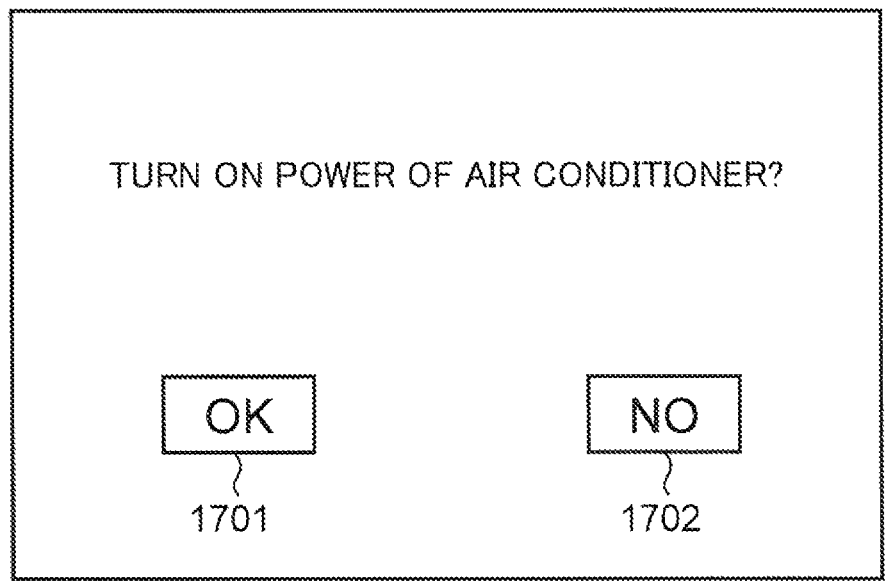
FIG. 17 is a diagram showing an example of a screen for inquiring contents of a control instruction to a user according to an embodiment of the present invention.

Upon receiving the inquiry notification (step S1611), the transmitting/receiving unit 401 of the gateway 103 transmits the received inquiry notification to the input apparatus (step S1612). Upon receiving the inquiry notification (step S1621), the input apparatus displays contents of the control instruction on the display (step S1622). At this point, the input apparatus displays a screen such as that shown in FIG. 17 on the display. FIG. 17 is a diagram showing an example of a screen for inquiring contents of a control instruction to a user. In the example shown in FIG. 17, since a control instruction of power ON of an air conditioner has been decided by the server apparatus 101 based on the voice information, a text reading "Do you wish to turn on the air conditioner?" is displayed. A consent button 1701 with the description "OK" and a non-consent button 1702 with the description "NO" are arranged below the text. When consenting to power ON of the air conditioner or, in other words, when the voice recognition by the server apparatus 101 is correct, the user inputs an operation for selecting the consent button 1701 to the input apparatus. On the other hand, when not consenting to power ON of the air conditioner or, in other words, when the voice recognition by the server apparatus 101 is incorrect, the user inputs an operation for selecting the non-consent button 1702 to the input apparatus.

When an operation for selecting the consent button 1701 or the non-consent button 1702 is input by the user and a confirmation result by the user regarding whether or not to consent to the control instruction is input (step S1623), the input apparatus transmits the confirmation result to the gateway 103 (step S1624). At this point, when the consent button 1701 is selected by the user, a confirmation result including information indicating consent is transmitted to the gateway 103, and when the non-consent button 1702 is selected by the user, a confirmation result including information indicating non-consent is transmitted to the gateway 103.

When the transmitting/receiving unit 401 of the gateway 103 receives the confirmation result (step S1613), if the confirmation result includes information indicating consent (YES in S1614), the determining unit 406 determines that the recognition result of the voice information by the server apparatus 101 is correct and transmits a control instruction related to the inquiry notification transmitted in step S1601 to the household electrical appliance 104 that is an object via the transmitting/receiving unit 401 (step S1615). For example, when the user consents to the control instruction for turning on power of the air conditioner, the control instruction for power ON is transmitted to the air conditioner.

When the transmitting/receiving unit 501 of the object household electrical appliance 104 receives the control instruction from the gateway 103 (step S1631), the executing unit 502 executes the control instruction (step S1632). For example, upon receiving the control instruction for power ON, the air conditioner turns its power on.

In step S1614, when the confirmation result includes information indicating non-consent (NO in S1614), the process skips step S1615 and advances to step S1616.

In step S1616, the control unit 503 of the gateway 103 transmits the confirmation result received in step S1613 to the server apparatus 101 via the transmitting/receiving unit 501 (step S1616). When the transmitting/receiving unit 201 of the server apparatus 101 receives the confirmation result (step S1602), the determining unit 206 stores the received confirmation result in association with the control instruction and the voice information related to the inquiry in a recognition result database (step S1603). FIG. 18 is a diagram showing an example of a data configuration of the recognition result database. In the example of the recognition result database shown in FIG. 18, a "gateway ID", a "date", a "confirmation result", "voice information", and a "recognized control instruction" are stored in association with each other. The "gateway ID" represents a gateway ID of the gateway 103 having transmitted a confirmation result. The "date" represents a date and time of reception of the confirmation result. The "confirmation result" represents contents of the confirmation result. In this case, consent or non-consent is adopted as the contents of the confirmation result. The "voice information" represents voice information that is a recognition source of the control instruction related to the inquiry. In the example shown in FIG. 18, voice information of "atsui (hot)" is stored. In this case, the voice information stored in the recognition result database may be, for example, text data of a recognized voice or waveform data of a voice signal.

The "recognized control instruction" represents a recognition result of voice information by the recognizing unit 202 of the server apparatus 101. In the example of a 1st-row record shown in FIG. 18, since the recognizing unit 202 has recognized that the voice information stored in the record represents power ON of the air conditioner, "power ON of air conditioner" is stored.

By constructing the recognition result database in this manner, the server apparatus 101 can learn control instructions with respect to voice information. For example, let us assume that voice information "atsui" is transmitted from a given gateway 103, the server apparatus 101 interprets "atsui" to mean that the temperature in the room is high and decides power ON of the air conditioner as a control instruction, but a confirmation result indicating non-consent is input by the user with respect to the control instruction. In this case, the server apparatus 101 may subsequently decide a control instruction other than power ON of the air conditioner with respect to "atsui".

In the present modification, an inquiry is made to the user regarding whether or not the control instruction recognized by the server apparatus 101 is correct, and when a confirmation result indicating consent is input, the control instruction is transmitted to the household electrical appliance 104. Therefore, the household electrical appliance 104 can be prevented from performing an operation that is contrary to the user's intention.

(6) When the gateway 103 transmits a control instruction to the household electrical appliance 104, contents of the control instruction may be presented to the user on an input apparatus (such as a television or a smartphone) and the household electrical appliance 104 may execute the control instruction upon obtaining permission by the user.

Figure 19:
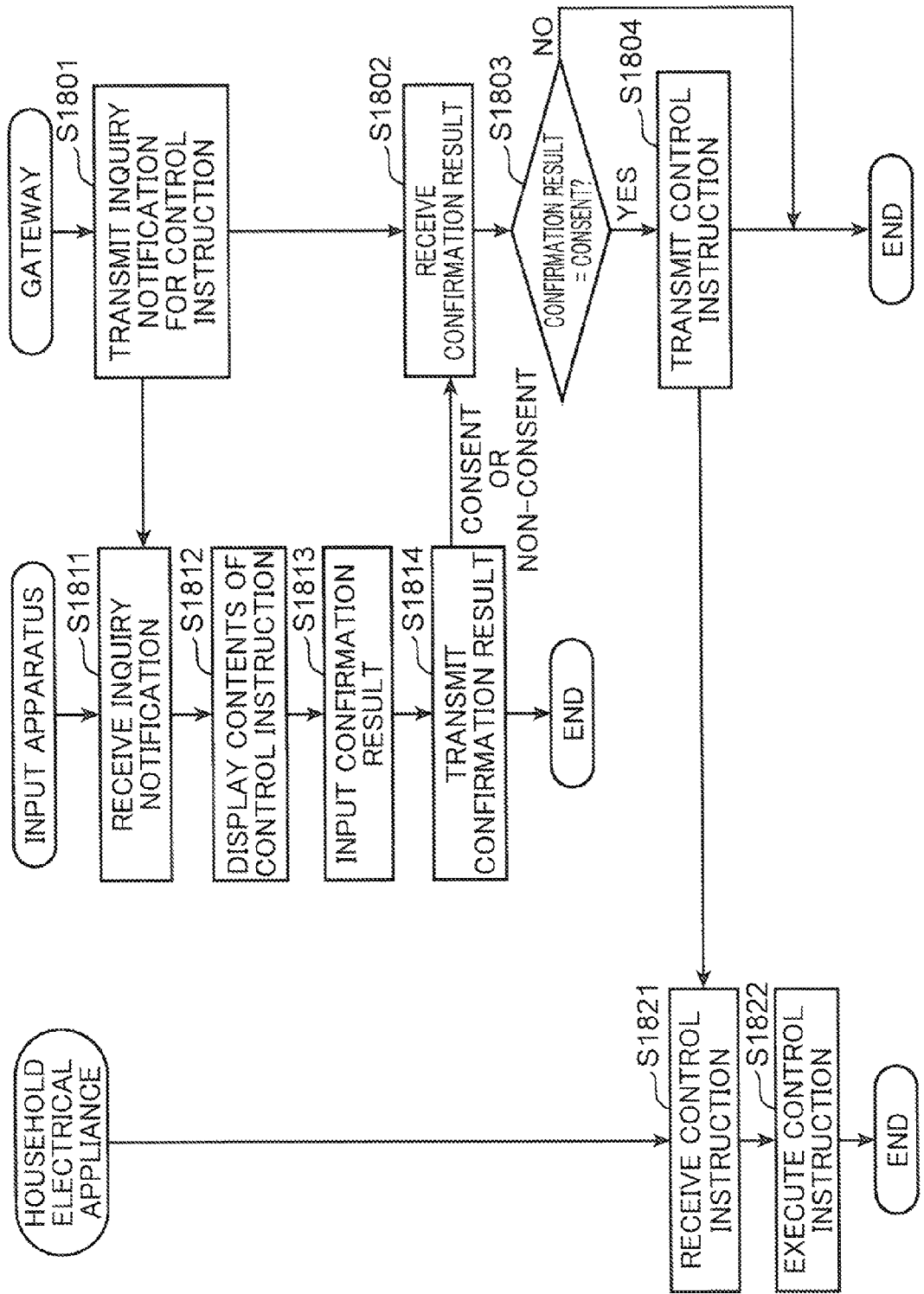
FIG. 19 is a flow chart of another modification of an embodiment of the present invention.

Hereinafter, this modification will be described. FIG. 19 is a flow chart of another modification of an embodiment of the present invention. First, when an analysis result of voice information by the analyzing unit 402 of the gateway 103 is a fixed phrase and the determining unit 406 decides a control instruction corresponding to the fixed phrase, the determining unit 406 transmits an inquiry notification for making an inquiry to the user regarding whether or not the decided control instruction is correct to the input apparatus via the transmitting/receiving unit 401 (step S1801). Steps S1811 to S1814 are the same as the steps S1621 to S1624 shown in FIG. 16.

When the transmitting/receiving unit 401 of the gateway 103 receives the confirmation result (step S1802), if the confirmation result includes information indicating consent (YES in S1803), the determining unit 406 determines that the analysis result of the voice information by the analyzing unit 402 is correct and transmits a control instruction related to the inquiry notification transmitted in step S1801 to the household electrical appliance 104 that is an object via the transmitting/receiving unit 401 (step S1821). Step S1822 is the same as step S1632 shown in FIG. 16.

In step S1803, when the confirmation result includes information indicating non-consent (NO in S1803), the process skips step S1804 and is terminated.

In the present modification, an inquiry is made to the user regarding whether or not the control instruction recognized by the gateway 103 is correct, and when a confirmation result indicating consent is input, the control instruction is executed by the household electrical appliance 104. Therefore, the household electrical appliance 104 can be prevented from performing an operation that is contrary to the user's intention.

(7) The voice model and dictionary data stored in the database storing unit 203 of the server apparatus 101 and the voice model and dictionary data stored in the database storing unit 403 of the gateway 103 may be updatable. In this case, the gateway 103 may update the voice model 1401 and the dictionary data 1402 stored in the database storing unit 403 or the gateway 103 may acquire update data from the server apparatus 101 to update the voice model 1401 and the dictionary data 1402 stored in the database storing unit 403.

First, a mode in which update data is acquired from the server apparatus 101 and the gateway 103 updates a database will be described. For example, let us assume that, in the database storing unit 403 in an initial state, "air conditioner ON" is stored as a fixed phrase that is a control instruction for turning on the power of the air conditioner but "put on air conditioner" that indicates the same control instruction is not stored. Let us further assume that voice information of "put on air conditioner" is transmitted to the server apparatus 101 and the server apparatus 101 recognizes that this voice information indicates turning on the power of the air conditioner using the method described in modification (5). In this case, the server apparatus 101 transmits update data indicating that "put on air conditioner" is a fixed phrase of power ON of the air conditioner to the gateway 103. The gateway 103 having received the update data stores "put on air conditioner" as a fixed phrase in the database storing unit 403 and, at the same time, registers "turn on air conditioner" in the control information table (FIG. 8) in association with the control instruction for power ON of the air conditioner. Accordingly, hereinafter, when the voice information "put on air conditioner" is input, the voice information is recognized as a fixed phrase by the gateway 103 and is processed by the gateway 103 without being transmitted to the server apparatus 101.

As a result, fluctuations in fixed phrases attributable to dialects can be learned. For example, while "eakon on (air conditioner ON)" can be used anywhere in Japan as a phrase that signifies turning on the power of an air conditioner, the phrase "eakon ireru (put on air conditioner)" which has the same meaning may not be usable in certain parts of Japan. Meanwhile, registering fixed phrases of all local dialects of the Japanese language corresponding to "air conditioner ON" in the gateway 103 is not favorable when considering that the gateway 103 has limited memory resources. Therefore, by registering a fixed phrase in the gateway 103 as necessary, such dialects can be learned. In addition, using this method enables learning of not only dialects but also special words that are only usable in a home.

Next, a mode in which the gateway 103 updates a database will be described. Let us assume that, for example, the server apparatus 101 has always transmitted a control instruction for power ON of the air conditioner to the gateway 103 with respect to voice information "hot". In this case, when a control instruction for power ON of the air conditioner is transmitted by the server apparatus 101 at a prescribed value or more with respect to the voice information "hot", the gateway 103 may register "hot" as a fixed phrase in the database storing unit 403 and, at the same time, register "hot" in association with a control instruction for power ON of the air conditioner in the control information table (FIG. 8). In order to achieve the above, for example, the gateway 103 may accumulate voice information transmitted to the server apparatus 101 and a control instruction corresponding to the voice information transmitted by the server apparatus 101 as log information in a storage apparatus. In addition, the gateway 103 may periodically analyze the log information, and when a same control instruction is transmitted by the server apparatus 101 with respect to given voice information at a prescribed value or more, the gateway 103 may register a word or a phrase expressed by the voice information as a fixed phrase in the database storing unit 403 and, at the same time, register the fixed phrase in association with a corresponding control instruction in the control information table (FIG. 8).

(8) The gateway 103 may mainly perform a simplified analysis involving extracting an analysis keyword (word or fixed phrase) registered in advance or the like and the server apparatus 101 may perform higher-level recognition processes of intentions, nuances, and the like. In this case, a learning function (updating of the voice model 1501, the dictionary data 1502, and the like, updating of methods of analyzing and recognizing voice information, and the like) may be provided in the server apparatus 101, and the server apparatus 101 may share learning results with the gateway 103. In other words, the server apparatus 101 may update the voice model 1401 and the dictionary data 1402 stored in the gateway 103 when updating the voice model 1501 and the dictionary data 1502. Due to the learning function of the server apparatus 101 described above, the fixed phrase database is updated and strengthened and is also shared with the gateway 103.

(9) Different processes may be applied between a case where a user explicitly issues a control instruction to the household electrical appliance 104 and a case where the server apparatus 101 interprets intentions of the user from contents of conversations and issues a control instruction. When the user explicitly issues a control instruction, the control instruction from the gateway 103 or the server apparatus 101 to the household electrical appliance 104 may be directly transmitted to the household electrical appliance 104 and the household electrical appliance 104 may immediately execute the control instruction. On the other hand, when the control instruction is issued after interpreting intentions, the gateway 103 may first present contents of the control instruction to an input apparatus, and upon input of a confirmation result signifying consent by the user, transmit the control instruction to the household electrical appliance 104 that is an object.

(10) Voice information that is transmitted from the gateway 103 to the server apparatus 101 may be transmitted encoded and accumulated in the server apparatus 101. In this case, the server apparatus 101 may accumulate the voice information in either a plaintext format or a cipher text format. In addition, the voice information upon accumulation may be encoded using a special key. As the special key, data generated based on data only known to the user such as a keyword set by the user or data generated based on data only known to a third party can be adopted. In addition, as the special key, data that can be decoded with the cooperation of the user or a third party can be adopted.

(11) After the gateway 103 transmits a control instruction to the household electrical appliance 104 as a result of analyzing voice information, the gateway 103 may transmit the voice information to the server apparatus 101 and the server apparatus 101 may execute voice recognition. At this point, when a control instruction of the gateway 103 and a control instruction of the server apparatus 101 differ from one another, the control instruction of the server apparatus 101 may be prioritized or the control instruction of the gateway 103 may be prioritized. Alternatively, both control instructions may be presented to the user to be confirmed and the household electrical appliance 104 may be operated according to the control instruction indicated by a confirmation result by the user.

(12) In the embodiment described above, when an inquiry notification related to a control instruction is transmitted by the server apparatus 101, the gateway 103 may transmit voice information that is a confirmation result with respect to the inquiry notification to the server apparatus 101 without analyzing the voice information.

Figure 20:
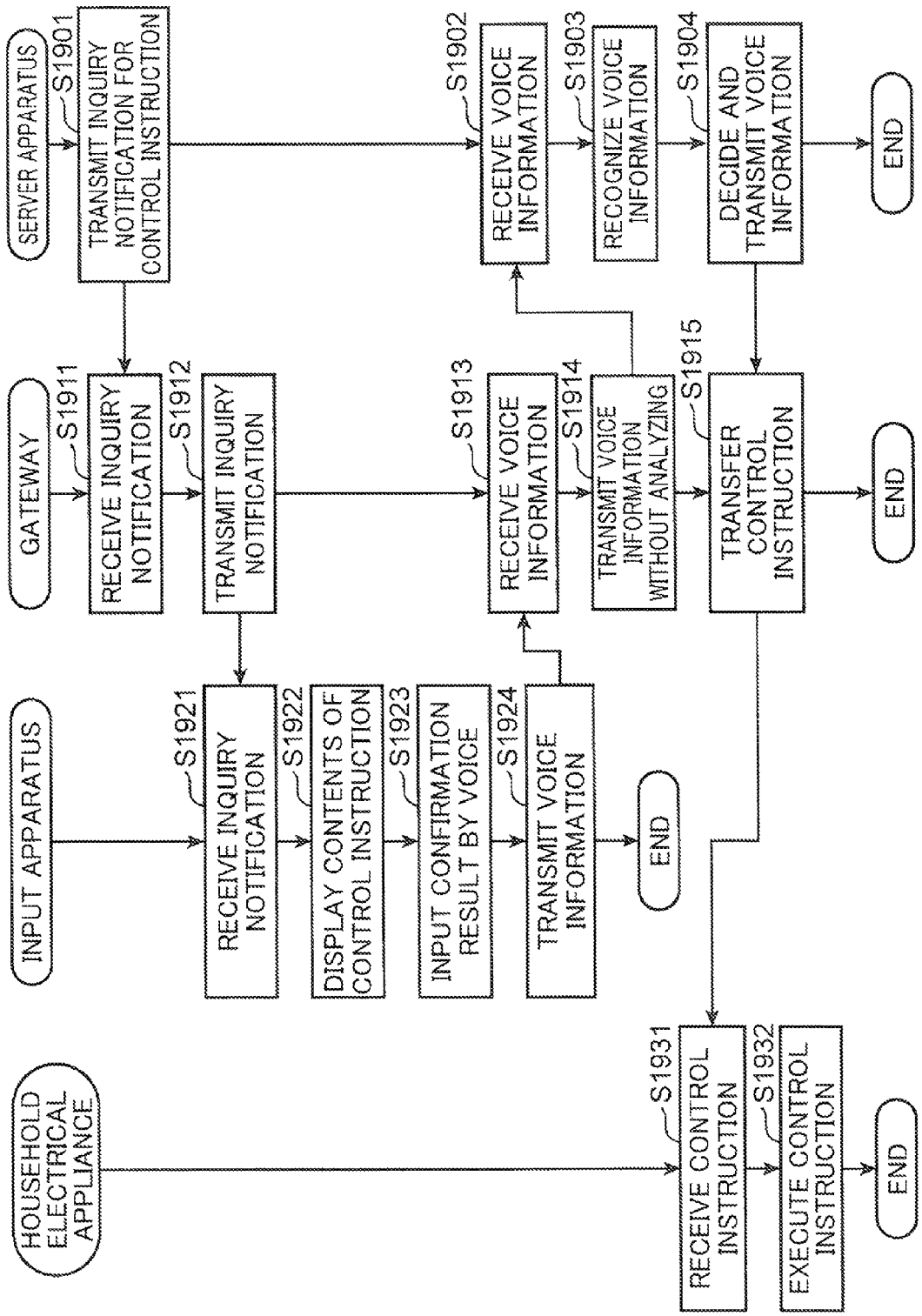
FIG. 20 is a flow chart of yet another modification of an embodiment of the present invention.

Hereinafter, this modification will be described. FIG. 20 is a flow chart of yet another modification of an embodiment of the present invention. Since processes other than steps S1922, S1923, S1924, S1913, S1914, S1915, S1902, S1903, and S1904 are the same as the processes shown in FIG. 16, a description thereof will be omitted.

An input apparatus having received an inquiry notification from the gateway 103 displays contents of the control instruction on a display (step S1922). At this point, the input apparatus displays a screen such as that shown in FIG. 21 on the display. FIG. 21 is a diagram showing an example of a screen for inquiring contents of a control instruction to a user. In this case, it is assumed that a confirmation result is input by voice. In addition, the server apparatus 101 has decided a control instruction for power ON of an air conditioner based on voice information. Therefore, texts reading "Power ON of air conditioner?" and "Please input confirmation result by voice" are displayed in FIG. 21.

When the user inputs a confirmation result indicating consent or non-consent by voice to the input apparatus (step S1923), the input apparatus transmits voice information indicating the confirmation result to the gateway 103 (step S1924). In this case, the user may utter a voice such as "yes", "OK", and "I consent" when consenting and utter a voice such as "no", "NO", and "I do not consent" when not consenting.

Upon receiving voice information indicating a confirmation result (step S1913), the gateway 103 transmits the voice information to the server apparatus 101 without analyzing the voice information. When the transmitting/receiving unit 201 of the server apparatus 101 receives the voice information indicating a confirmation result (step S1902), the recognizing unit 202 recognizes the voice information (step S1903). At this point, if a word indicating consent such as "yes" is included in the voice information, the recognizing unit 202 determines that a recognition result of the voice information is correct. Subsequently, the recognizing unit 202 transmits a control instruction related to the inquiry notification to the gateway 103 (step S1904). On the other hand, in step S1903, if a word indicating non-consent such as "no" is included in the voice information, the recognizing unit 202 may determine that a recognition result of the voice information is not correct and may terminate the process. Alternatively, a control instruction corresponding to the voice information may be elicited from the user and the elicited result may be registered in the recognition result database (FIG. 18) in association with voice information.

Upon receiving the control instruction, the gateway 103 transfers the control instruction to the household electrical appliance 104 that is an object (step S1931).

At this point, when a mode is adopted in which the gateway 103 analyzes voice information indicating a confirmation result, for example, if the voice information includes a fixed phrase, the gateway 103 transmits a control instruction corresponding to the fixed phrase to the household electrical appliance 104. In this case, the server apparatus 101 cannot acquire a confirmation result by the user and cannot determine whether or not a recognition result of the voice information is correct. In consideration thereof, in the present modification, when the gateway 103 receives voice information indicating a confirmation result from the input apparatus, the gateway 103 transmits the voice information to the server apparatus 101 without analyzing the voice information. Accordingly, the server apparatus 101 can acquire a confirmation result by the user and determine whether or not a recognition result of the voice information is correct.

Figure 22:
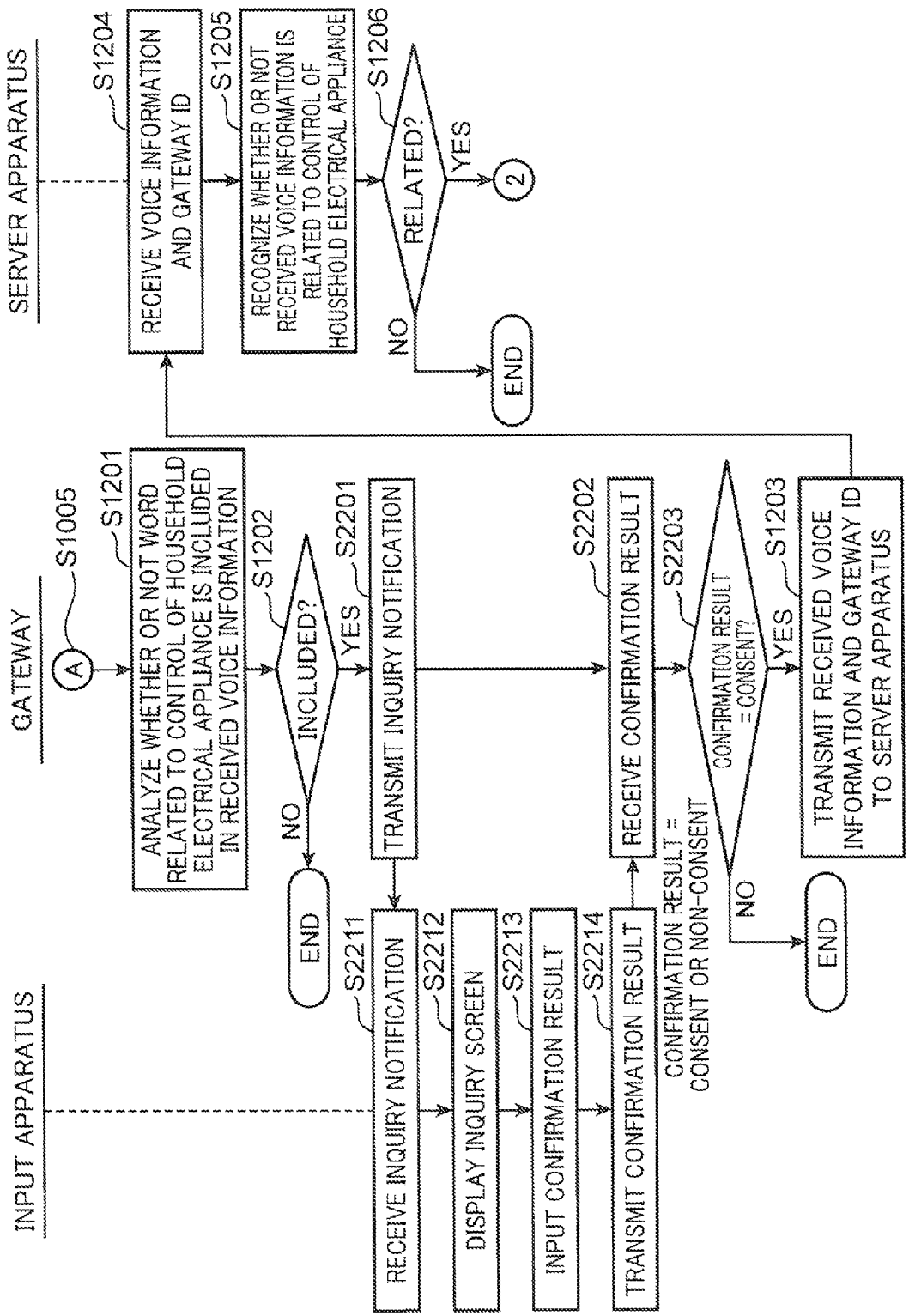
FIG. 22 is a flow chart of another modification of an embodiment of the present invention.

(13) In the present embodiment, when judging that voice information is to be transmitted to the server apparatus 101, the gateway 103 may inquire the user on whether or not to transmit the voice information. Hereinafter, this modification will be described. FIG. 22 is a flow chart of another modification of an embodiment of the present invention. The flow chart shown in FIG. 22 represents addition of steps S2201, S2202, S2203, S2211, S2212, and S2213 to the flow chart shown in FIG. 12.

In step S2201, the gateway 103 transmits an inquiry notification for inquiring the user on whether or not to transmit the voice information to the server apparatus 101 to an input apparatus. The input apparatus is constituted by a household electrical appliance 104 having a display in a similar manner to the input apparatus shown in FIG. 16 or the like.

Figure 23:
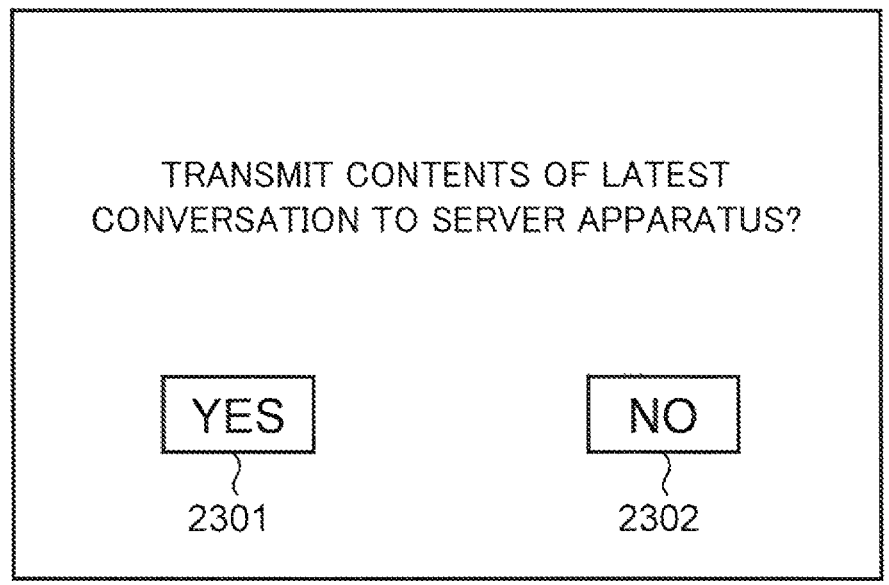
FIG. 23 is a diagram showing an example of a screen for inquiring whether or not to transmit voice information to a server apparatus to a user according to an embodiment of the present invention.

Upon receiving the inquiry notification (step S2211), the input apparatus displays an inquiry screen on the display (step S2212). At this point, the input apparatus displays a screen such as that shown in FIG. 23 on the display. FIG. 23 is a diagram showing an example of a screen for inquiring the user regarding whether or not to transmit voice information to the server apparatus 101. In the example shown in FIG. 23, a text reading "Do you wish to transmit contents of the latest conversation to the server apparatus?" is displayed. A consent button 2301 with the description "OK" and a non-consent button 2302 with the description "NO" are arranged below the text. When the user determines that the voice information may be transmitted to the server apparatus 101, the user inputs an operation for selecting the consent button 2301 to the input apparatus. On the other hand, when the user determines that the voice information should not be transmitted to the server apparatus 101, the user inputs an operation for selecting the non-consent button 2302 to the input apparatus.

When an operation for selecting the consent button 2301 or the non-consent button 2302 is input by the user and a confirmation result by the user regarding whether or not to transmit the voice information to the server apparatus 101 is input (step S2213), the input apparatus transmits the confirmation result to the gateway 103 (step S2214). At this point, when the consent button 2301 is selected by the user, a confirmation result including information indicating consent is transmitted to the gateway 103, and when the non-consent button 2302 is selected by the user, a confirmation result including information indicating non-consent is transmitted to the gateway 103. The gateway 103 receives the confirmation result (step S2202). In the case of a confirmation result indicating consent (YES in S2203), the gateway 103 advances the process to step S1203, and in the case of a confirmation result indicating non-consent (NO in S2203), the gateway 103 terminates the process.

In the present modification, even when the gateway 103 determines that the voice information is to be transmitted to the server apparatus 101, the voice information is transmitted to the server apparatus 101 only when permission to transmit the voice information to the server apparatus 101 is obtained from the user. Therefore, the privacy of the user can be further protected and, at the same time, the amount of data to be transmitted to the server apparatus 101 can be reduced.

(14) While the server apparatus 101, the sound collecting device 102, the gateway 103, and the household electrical appliance 104 are equipped with a plurality of functions (components) shown in FIGS. 2 to 5 in the embodiment described above, this configuration is not restrictive. The respective functions (components) shown in FIGS. 2 to 5 may be mounted to the server apparatus 101, the sound collecting device 102, the gateway 103, and the household electrical appliance 104 according to a different sharing pattern to the illustrated sharing pattern.

(15) The present embodiment may be the method described above. The present embodiment may also be a computer program that realizes this method by a computer or may be a digital signal constituted by the computer program.

In addition, the present embodiment may be a recording of the computer program or the digital signal on a computer-readable recording medium such as a flexible disk, a hard disk, a CD-ROM, an MO, a DVD, a DVD-ROM, a DVD-RAM, a BD (Blu-ray (registered trademark) Disc), and a semiconductor memory. Furthermore, the present embodiment may be the digital signal recorded on these recording media.

Furthermore, the present invention may be configured so that the computer program or the digital signal is transmitted via an electric communication line, a wireless or a wired communication line, a network such as the Internet, a data broadcast, or the like.

In addition, the present invention may be a computer system including a microprocessor and a memory, wherein the memory stores the computer program and the microprocessor operates in accordance with the computer program.

Furthermore, the present invention may be implemented by another independent computer system by recording the program or the digital signal on the recording medium and transporting the recording medium or by transmitting the computer program or the digital signal via the network.

(16) The embodiment and the modifications described above may be combined with one another.

Accordingly, in the present household electrical appliance control system, a simplified analysis of voice information is performed by the gateway 103, and when a control instruction cannot be decided by the gateway 103, the voice information is transmitted to the server apparatus 101. As a result, an amount of data transfer regarding voice information transmitted to the server apparatus 101 for voice recognition can be reduced.

In the present household electrical appliance control system, the gateway 103 extracts a keyword (word related to control of the household electrical appliance 104) stored in advance with respect to voice information collected by the sound collecting device 102 and transmits voice information including the extracted keyword to the server apparatus 101. In other words, when a keyword stored in advance is not included in voice information, the gateway 103 does not transmit the voice information to the server apparatus 101. In addition, if the voice information collected by the sound collecting device 102 is a fixed phrase, the gateway 103 transmits a control instruction corresponding to the fixed phrase to the household electrical appliance 104. In other words, when the gateway 103 is able to decide a control instruction with respect to the household electrical appliance 104 that is a control object on its own, the gateway 103 does not transmit voice information to the server apparatus 101.

Therefore, an amount of data transfer of the voice information that is transmitted to the server apparatus 101 for voice recognition can be further reduced.

In addition, by transmitting only a part of voice information collected by the sound collecting device 102 to the server apparatus 101, the present household electrical appliance control system can prevent data concentration at the server apparatus 101. Accordingly, a network load between the gateway 103 and the server apparatus 101 and a processing load on the server apparatus 101 can be reduced.

Furthermore, in the present household electrical appliance control system, only voice information, which is determined by the gateway 103 to need to be transmitted to the server apparatus 101 among the voice information collected by the sound collecting device 102, is transmitted to the server apparatus 101. Therefore, private information such as conversation that takes place in a home can be prevented from being transmitted to the server apparatus 101. In addition, by inquiring the user on whether or not privacy information is to be transmitted before transmitting the privacy information to the server apparatus 101, protection of privacy can be further strengthened.

INDUSTRIAL APPLICABILITY

In a household electrical appliance control system according to the present invention, only voice information that a gateway determines it necessary to be subjected to voice recognition by a server apparatus among voice information collected by a sound collecting device is transmitted to the server apparatus. Therefore, the present invention is useful in a networked household electrical appliance system that controls household electrical appliances using voice information.

The invention claimed is:

1. A control method for a household electrical appliance in a household electrical appliance control system including a server apparatus, a household electrical appliance, a gateway, and a sound collecting device, wherein:

the sound collecting device, the gateway, and the household electrical appliance are connected so as to be capable of communicating with each other via a local area network, and the gateway and the server apparatus are connected via the Internet to be capable of communicating with each other, the gateway receives voice information of a user from the sound collecting device via the local area network, analyzes the received voice information, and when judging that the analyzed voice information is voice information related to control of the household electrical appliance, transmits the voice information to the server apparatus via the Internet;

the server apparatus recognizes the voice information received from the gateway, and when judging that the recognized voice information is voice information related to control of the household electrical appliance, transmits a control instruction corresponding to the voice information to the gateway; and the household electrical appliance receives the control instruction from the server apparatus via the gateway and executes the control instruction.

2. The control method according to claim 1, wherein when judging that the voice information received from the sound collecting device indicates a fixed phrase related to control of the household electrical appliance, the gateway transmits a control instruction corresponding to the fixed phrase to the household electrical appliance instead of transmitting the voice information to the server apparatus.

3. The control method according to claim 2, wherein when judging that the received voice information indicates the fixed phrase, the gateway causes contents of a control instruction corresponding to the fixed phrase to be output to an input apparatus connected via a network, and when a confirmation input by the user signifying that the contents are correct is accepted by the input apparatus, the gateway transmits the control instruction corresponding to the fixed phrase to the household electrical appliance.

4. The control method according to claim 3, wherein the network is the local area network.

5. The control method according to claim 2, wherein the gateway decides a control instruction corresponding to the fixed phrase using a control information table in which the fixed phrase and a control instruction corresponding to the fixed phrase are stored in association with each other.

6. The control method according to claim 2, wherein the fixed phrase is a phrase including a household electrical appliance to be a control object and a control instruction with respect to the household electrical appliance, and
the voice information related to control of the household electrical appliance is voice information that does not correspond to the fixed phrase but includes a word related to control of the household electrical appliance.

7. The control method according to claim 1, wherein the gateway causes contents of the control instruction received from the server apparatus to be output to an input apparatus connected via a network, and when a confirmation input by the user signifying that the contents are correct is accepted by the input apparatus, the gateway transmits the control instruction received from the server apparatus to the household electrical appliance.

8. The control method according to claim 7, wherein the network is the local area network.

9. The control method according to claim 1, wherein the server apparatus transmits an inquiry notification for making an inquiry to the user regarding whether or not a recognition result of the voice information transmitted from the gateway is correct, and
the gateway causes the recognition content indicated by the inquiry notification to be output to an input apparatus connected via a network, and when voice information which indicates an answer from the user with respect to the recognition content and which is accepted by the input apparatus is received from the input apparatus, the gateway transmits the accepted voice information to the server apparatus without analyzing the voice information.

10. The control method according to claim 9, wherein the network is the local area network.

11. The control method according to claim 1, wherein when transmitting the voice information to the server apparatus, the gateway outputs an inquiry notification for making an inquiry to the user regarding whether or not the transmission is to be permitted, to an input apparatus connected via a network, and when a confirmation input by the user that permits the transmission is accepted by the input apparatus, the gateway transmits the voice information to the server apparatus.

12. The control method according to claim 11, wherein the network is the local area network.

13. The control method according to claim 1, wherein when transmitting the voice information to the server apparatus, the gateway acquires environmental information on surroundings of the gateway and transmits the environmental information to the server apparatus, and
the server apparatus decides the control instruction using the voice information and the environmental information transmitted from the gateway.

14. A household electrical appliance control system comprising a server apparatus, a household electrical appliance, a gateway, and a sound collecting device, wherein
the sound collecting device, the gateway, and the household electrical appliance are connected so as to be capable of communicating with each other via a local area network, and the gateway and the server apparatus are connected via the Internet to be capable of communicating with each other,
the sound collecting device includes:
a sound collecting unit that collects voice information of a user; and
a transmitting unit that transmits the collected voice information to the gateway via the local area network,
the gateway includes:
a first transmitting/receiving unit that receives the voice information from the sound collecting unit; and
an analyzing unit that analyzes the received voice information,
the first transmitting/receiving unit transmitting the voice information to the server apparatus via the Internet when the analyzing unit judges that the voice information is related to control of the household electrical appliance,
the server apparatus includes:
a second transmitting/receiving unit that receives the voice information from the gateway; and
a recognizing unit that recognizes the received voice information,
the second transmitting/receiving unit transmitting a control instruction corresponding to the voice information to the gateway when the recognizing unit judges that the voice information is voice information related to control of the household electrical appliance, and
the household electrical appliance includes:
a receiving unit that receives the control instruction from the server apparatus via the gateway; and
an executing unit that executes the received control instruction.

15. The household electrical appliance control system according to claim 14, wherein when judging that the voice information received from the sound collecting device indicates a fixed phrase related to control of the household electrical appliance, the gateway transmits a control instruction corresponding to the fixed phrase to the household electrical appliance instead of transmitting the voice information to the server apparatus.

16. The household electrical appliance control system according to claim 15, wherein when judging that the received voice information indicates the fixed phrase, the gateway causes contents of a control instruction corresponding to the fixed phrase to be output to an input apparatus connected via a network, and when a confirmation input by the user signifying that the contents are correct is accepted by the input apparatus, the gateway transmits the control instruction corresponding to the fixed phrase to the household electrical appliance.

17. The household electrical appliance control system according to claim 14, wherein the gateway causes contents of the control instruction received from the server apparatus to be output to an input apparatus connected via a network, and when a confirmation input by the user signifying that the contents are correct is accepted by the input apparatus, the gateway transmits the control instruction received from the server apparatus to the household electrical appliance.

18. A gateway in a household electrical appliance control system including a server apparatus, a household electrical appliance, the gateway, and a sound collecting device, wherein the sound collecting device, the gateway, and the household electrical appliance are connected so as to be capable of communicating with each other via a local area network, and the gateway and the server apparatus are connected via the Internet to be capable of communicating with each other, the gateway comprising:
- a first transmitting/receiving unit that receives the voice information from the sound collecting unit via the local area network; and
- an analyzing unit that analyzes the received voice information, wherein
  - the first transmitting/receiving unit transmits the voice information to the server apparatus via the Internet when the analyzing unit judges that the voice information is related to control of the household electrical appliance, and the first transmitting/receiving unit transmits, to the household electrical appliance, a control instruction transmitted by the server apparatus.

19. The gateway according to claim 18, wherein when judging that the voice information received from the sound collecting device indicates a fixed phrase related to control of the household electrical appliance, the gateway transmits a control instruction corresponding to the fixed phrase to the household electrical appliance instead of transmitting the voice information to the server apparatus.

20. The gateway according to claim 19, wherein when judging that the received voice information indicates the fixed phrase, the gateway causes contents of a control instruction corresponding to the fixed phrase to be output to an input apparatus connected via a network, and when a confirmation input by the user signifying that the contents are correct is accepted by the input apparatus, the gateway transmits the control instruction corresponding to the fixed phrase to the household electrical appliance.

21. The gateway according to claim 18, wherein the gateway causes contents of the control instruction received from the server apparatus to be output to an input apparatus connected via a network, and when a confirmation input by the user signifying that the contents are correct is accepted by the input apparatus, the gateway transmits the control instruction received from the server apparatus to the household electrical appliance.

* * * * *